(12) United States Patent
Tanioka et al.

(10) Patent No.: US 6,746,730 B1
(45) Date of Patent: Jun. 8, 2004

(54) VARNISH COMPOSITION AND LIQUID-CRYSTAL DISPLAY ELEMENT

(75) Inventors: Satoshi Tanioka, Ichihara (JP); Kumiko Fukui, Ichihara (JP); Shizuo Murata, Ichihara (JP); Hiroshi Ono, Ichihara (JP); Itsuo Shimizu, Ichihara (JP)

(73) Assignee: Chisso Corporation, Osaka (JP)

( * ) Notice: Subject to any disclaimer, the term of this patent is extended or adjusted under 35 U.S.C. 154(b) by 50 days.

(21) Appl. No.: 10/019,260

(22) PCT Filed: Jun. 21, 2000

(86) PCT No.: PCT/JP00/04054
§ 371 (c)(1),
(2), (4) Date: Dec. 28, 2001

(87) PCT Pub. No.: WO01/00732
PCT Pub. Date: Jan. 4, 2001

(30) Foreign Application Priority Data

Jun. 28, 1999 (JP) .......................................... 11-182552

(51) Int. Cl.$^7$ .............................................. C09K 19/00
(52) U.S. Cl. .................................... 428/1.1; 428/473.5
(58) Field of Search ........................ 428/1.1, 1.2, 1.21, 428/1.25, 1.26, 1.27, 1.28, 1.6, 473.5

(56) References Cited

U.S. PATENT DOCUMENTS

| | | | | |
|---|---|---|---|---|
| 4,759,614 A | * | 7/1988 | Yokokura et al. | 350/350 S |
| 5,659,411 A | * | 8/1997 | Nito et al. | 349/117 |
| 5,714,209 A | * | 2/1998 | Asaoka et al. | 428/1 |
| 5,783,656 A | * | 7/1998 | Kimura et al. | 528/353 |
| 5,858,274 A | * | 1/1999 | Mishina et al. | 252/299.4 |
| 5,907,005 A | * | 5/1999 | Shimizu | 524/104 |
| 5,954,999 A | * | 9/1999 | Mishina et al. | 252/299.4 |
| 6,051,288 A | * | 4/2000 | Kondo et al. | 428/1 |
| 6,139,917 A | * | 10/2000 | Sano et al. | 427/385.5 |

FOREIGN PATENT DOCUMENTS

| | | |
|---|---|---|
| JP | 7-286134 | 10/1995 |
| JP | 3-246515 | 9/1999 |
| JP | 11-264981 | 9/1999 |

OTHER PUBLICATIONS

Patent Abstracts of Japan for JP 11–264981 published Sep. 28, 1999.
Patent Abstracts of Japan for JP–286134 published Oct. 31, 1995.
Patent Abstracts of Japan for JP 03–246515 published Nov. 1, 1991.

* cited by examiner

*Primary Examiner*—Mark F. Huff
*Assistant Examiner*—Jennifer R Sadule
(74) *Attorney, Agent, or Firm*—Wenderoth, Lind & Ponack, L.L.P.

(57) ABSTRACT

A varnish composition which comprises a solvent and a polymer component comprising a polyamic acid (B) (having residues which are derived from tetracarboxylic acids and a diamine respectively and which are residues having no side chains or residues having a pendant $C_{1-2}$ alkyl group or are residues having a composition comprising a mixture of these), a polyamic acid (A) (having residues which are derived from tetracarboxylic acids and a diamine respectively and at least either of which is a residue having a pendant $C_{3+}$ alkyl group or is a residue having a composition containing that residue), and a soluble polyimide, and in which the proportion of the polyamic acid (A) to the soluble polyimide is 1/99 to 99/1 by weight, the, sum of the polyamic acid (A) and the soluble polyimide accounts for 1 to 80 wt. % of the polymer component, the polyamic acid (B) accounts for 99 to 20 wt. % of the polymer component, and the proportion of the polymer component in the whole varnish composition is 0.1 to 40 wt. %. Also provided is a liquid-crystal display element having an alignment film formed from this varnish composition.

20 Claims, 1 Drawing Sheet

VARNISH COMPOSITION AND LIQUID-CRYSTAL DISPLAY ELEMENT

This application is a 371 application of PCT/JP00/04054 filed June 21, 2000.

TECHNICAL FIELD

This invention relates to varnish compositions which provide excellent characteristics in respect of electrical properties (voltage holding ratio, residual charge or image sticking resistance), acceptable pretilt angle, coating property, or alignment property of a liquid crystal molecule, etc., when used as a liquid crystal aligning film. Since the varnish composition of the invention has excellent electrical properties, it can be also used for an insulating coat, a protective coat, etc. in the field of electronic materials in addition to the liquid crystal aligning film.

BACKGROUND ART

In a liquid crystal display element, a display element using a nematic liquid crystal is now prevailing. Display elements by various systems are put to practical use, such as a matrix TN element twisted 90 degrees, a STN element usually twisted 180 degrees or more, a TFT liquid crystal display element using a thin film transistor, and an IPS (In Plane Switching) liquid crystal display element of horizontal electric field (electric field directed in parallel to a circuit board plane) type which is improved in visual angle characteristics. However, progress of a liquid crystal display element is not necessarily seen only in the development of display system. For the purpose of improving the properties of a liquid crystal display element, its associated material has also been improved actively. A liquid crystal aligning film is one of the important elements concerning the display quality of a liquid crystal display element, and its role becomes larger as a display element of high quality is required.

The liquid crystal aligning agents that are mainly used now include polyamic acid and soluble polyimide resins. Of these conventional materials for the liquid crystal aligning film, however, there have not yet been found those which have comprehensively sufficient characteristics in respect of electrical properties as a liquid crystal display element, coating property of the aligning agent, pretilt angle (large angle is desired), alignment of a liquid crystal molecule, etc.

Methods of mixing a soluble polyimide with a polyamic acid have been studied for improving electrical properties (particularly, small residual charge, large voltage holding ratio) of a liquid crystal display element. In this case, a soluble polyimide with a side chain group does not give so large pretilt angle (refer to Comparative Examples as given later). For this reason, when a certain degree of pretilt angle is required in a TFT element, a STN element, etc., there are the problems of easy occurrence of domain, etc. Since a soluble polyimide has poor solubility as compared with a polyamic acid, the selection range of the solvent is restricted. Even if a polyimide having the solubility as good as the polyamic acid is prepared, however, a polyimide aligning film made therefrom may easily be dissolved by a liquid crystal because of its good solubility, and thus the alignment of a liquid crystal molecule may be disturbed.

Moreover, most of good solvents to a polyimide are aprotic polar solvents generally having large surface tension and have the problems of cissing apt to occur upon coating, etc. When a polyamic acid is used, a solvent having small surface tension such as cellosolve and carbitol solvents is usually added in these solvents for the purpose of more improving the coating property, etc. However, if these solvents are used as a solvent for a polyimide varnish in such a large amount as to improve the coating property, there may arise the problem that a polyimide is easy to precipitate. Moreover, the reason that the coating property of a polyimide varnish is inferior to a polyamic acid varnish may be the fact that a polyimide does not have a carboxyl group, in addition to the above-mentioned problem that the selection range of the solvent is restricted.

Moreover, there is a problem of the voltage holding ratio concerning electrical properties of a liquid crystal display element. That is, voltage is not applied continuously to the liquid display element during the display of the image. As shown in FIG. 2, voltage is turned OFF in a short time after the application of voltage, and subsequently a reverse voltage is applied for a short time after a fixed time, and voltage is again turned OFF, thereby performing the display of image. In this manner, it is desirable to hold an applied voltage as it is when voltage is turned OFF, but voltage actually drops without holding the applied voltage as it is. If this voltage drop is large, the contrast of a display image will be lowered. Thus, it is preferred that the voltage holding ratio is larger.

On the other hand, mixing a polyamic acid free from a side chain with a polyamic acid having a long side chain may prepare a liquid crystal display element having small residual charge, depending on the combination of polyamic acids, but the improvement in image sticking is insufficient even in that case.

If a liquid crystal display element is left for some time with voltage applied, a charge is accumulated. The accumulated charge remains as it is when voltage is turned OFF, and the display element may be in the state as if voltage were applied. When voltage is turned OFF or the image is switched to another one, in such a state, a phenomenon will occur wherein a previous image remains displayed or a vague image outline remains. This phenomenon is usually called "image sticking".

It is usually said that small residual charge can overcome this image sticking. Although this may generally be right, the mechanism for the generation of an image sticking is complicated and the image sticking may not be fully estimated by measurement of only a residual charge (In fact, the mechanism of an image sticking is not fully solved).

In the present invention, the estimation of an image sticking is not based on the measurement of a residual charge, but is actually performed by visual observation of the image sticking of a cell.

Such a phenomenon poses a great problem especially in a TN type TFT or an IPS element.

An object of the present invention is to provide an improved aligning agent which can overcome the above-mentioned disadvantages in the case of mixing a polyamic acid with a soluble polyimide in the varnish for aligning agents, which has a great influence on the display characteristics of a liquid crystal display element.

More particularly, a subject of the invention is to provide a varnish composition for aligning agents which can adjust a pretilt angle arbitrarily (it hardly generates a domain accordingly), gives no or little image sticking, and has excellent coating property (no cissing occurs and the coating of uniform thickness is obtained).

DISCLOSURE OF THE INVENTION

As a result of our intensive studies for the purpose of overcoming the above-mentioned problems in the prior art, the inventors have found that a varnish composition in a specific combination is useful as an aligning film material used for a liquid crystal display element, thus leading to the completion of the present invention.

The present invention includes the following items (1) to (20).

(1) A varnish composition which comprises a polymer component containing a polyamic acid B represented by formula (1), a polyamic acid A represented by formula (2) and a soluble polyimide represented by formula (3), and a solvent for dissolving the polymer component, in which the weight ratio of the polyamic acid A to the soluble polyimide in the polymer component is 1/99 to 99/1, the sum of the polyamic acid A and the soluble polyimide accounts for 1 to 80% by weight of the polymer component, the polyamic acid B accounts for 99 to 20% by weight of the polymer component, and the proportion of the polymer component in the whole varnish composition is 0.1 to 40% by weight;

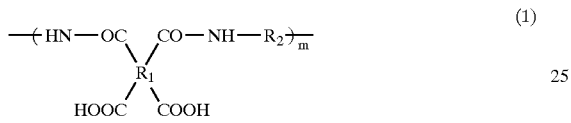

wherein $R_1$ is a tetravalent organic radical derived from tetracarboxylic acids, $R_2$ is a divalent organic radical derived from a diamine, each of which is a radical having no side chain, a radical having an alkyl side chain of less than 3 carbon atoms or a radical comprising a mixture of these, and m is a positive integer;

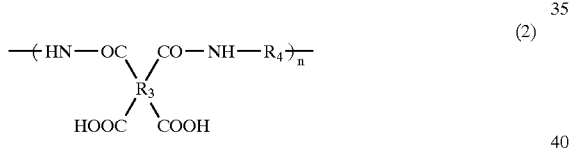

wherein $R_3$ is a tetravalent organic radical derived from tetracarboxylic acids, $R_4$ is a divalent organic radical derived from a diamine, at least one of $R_3$ and $R_4$ is a radical having a side chain of 3 or more carbon atoms or a radical comprising said radical, and n is a positive integer; and

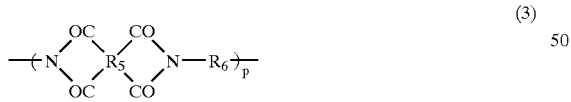

wherein $R_5$ is a tetravalent organic radical derived from tetracarboxylic acids, $R_6$ is a divalent organic radical derived from a diamine, and p is a positive integer.

(2) The varnish composition set forth in the item (1), wherein the soluble polyimide represented by formula (3) in the polymer component contains a radical having a side chain of 3 or more carbon atoms in at least one of the tetravalent organic radical $R_5$ derived from tetracarboxylic acids and the divalent organic radical $R_6$ derived from a diamine, the weight ratio of the polyamic acid A to the soluble polyimide is 10/90 to 90/10, and the sum of the polyamic acid A and the soluble polyimide accounts for 2 to 50% by weight of the polymer component.

(3) The varnish composition set forth in the item (1) or (2), wherein in the polyamic acid B represented by formula (1), 10 to 100 mol % of the tetravalent organic radical $R_1$ derived from tetracarboxylic acids is a tetravalent organic radical derived from alicyclic tetracarboxylic acids, and the divalent organic radical $R_2$ derived from a diamine is a radical comprising at least one divalent organic radical selected from the group consisting of a divalent organic radical derived from an aromatic diamine, a divalent organic radical derived from an alicyclic diamine, and a divalent organic radical derived from a diamine containing two or more groups of aromatic, alicyclic and aliphatic groups.

(4) The varnish composition set forth in any one of the items (1) to (3), wherein in the polyamic acid B represented by formula (1), 10 to 100 mol % of the tetravalent organic radical $R_1$ derived from tetracarboxylic acids is a tetravalent organic radical derived from alicyclic tetracarboxylic acids, and 1 to 100 mol % of the divalent organic radical $R_2$ derived from a diamine is at least one radical selected from the group consisting of the radicals represented by formula (4)

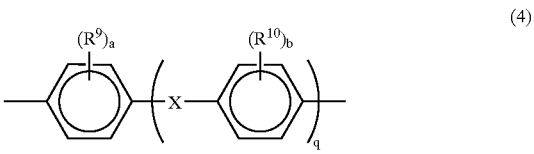

wherein X represents a single bond, $CH_2$, $CH_2CH_2$, $CH_2CH_2CH_2$, $CH_2CH_2CH_2CH_2$ or $C(CH_3)_2$, $R^9$ and $R^{10}$ each independently represent hydrogen, methyl or ethyl, a and b are individually an integer of 1 or 2, and q is an integer of 0 to 3, provided that when q is 2 or 3, each X may be different from each other.

(5) The varnish composition set forth in any one of the items (1) to (4), wherein in the polyamic acid B represented by formula (1), 10 to 100 mol % of the tetravalent organic radical $R_1$ derived from tetracarboxylic acids is a tetravalent organic radical derived from a cyclobutanetetracarboxylic acids, and the divalent organic radical $R_2$ derived from a diamine is a radical comprising a divalent organic radical derived from at least one compound selected from the group consisting of 4,4'-diaminodiphenylmethane, 4,4'-diaminodiphenylethane, 1,4-bis[2-(4-aminophenyl)ethyl]benzene, 1,4-bis(4-aminophenylmethyl)benzene, 1,3-bis[4-(4-aminophenylmethyl)phenyl]propane and bis[4-(4-aminophenylmethyl)phenyl]methane.

(6) The varnish composition set forth in any one of the items (1) to (5), wherein in the polyamic acid A represented by formula (2), $R_3$ is at least one tetravalent organic radical selected from the group consisting of a tetravalent organic radical derived from aromatic tetracarboxylic acids, a tetravalent organic radical derived from aliphatic tetracarboxylic acids and a tetravalent organic radical derived from alicyclic tetracarboxylic acids, and $R_4$ is at least one divalent organic radical selected from the group consisting of a divalent organic radical derived from an aromatic diamine, a divalent organic radical derived from an alicyclic diamine, a divalent organic radical derived from an aliphatic diamine, and a divalent organic radical derived from a diamine containing two or more groups of aromatic, alicyclic and aliphatic groups.

(7) The varnish composition set forth in any one of the items (1) to (6), wherein in the polyamic acid A represented by formula (2), 1 to 100 mol % of the divalent organic radical $R_4$ derived from a diamine is a divalent organic radical derived from a diamine having a side chain of 3 or more carbon atoms.

(8) The varnish composition set forth in any one of the items (1) to (7), wherein in the polyamic acid A represented by formula (2), the tetravalent organic radical $R_3$ derived from tetracarboxylic acids contains as an essential ingredient, a radical of pyromellitic acids, a radical of cyclobutane tetracarboxylic acids, or both the radical of pyromellitic acids and the radical of cyclobutane tetracarboxylic acids, 1 to 100 mol % of the divalent organic radical $R_4$ derived from a diamine is at least one radical selected from the group consisting of the radicals represented by formulas (5-1), (5-2), (5-3), (5-4), (6), (7) and (8), and 99 to 0 mol % of said divalent organic radical is at least one radical selected from the group consisting of the radicals represented by formula (4).

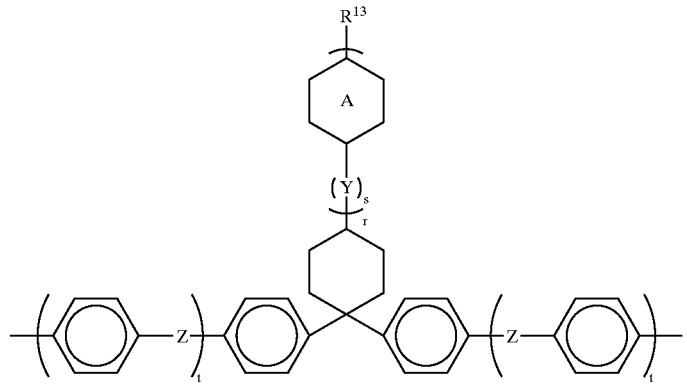

(5-1)

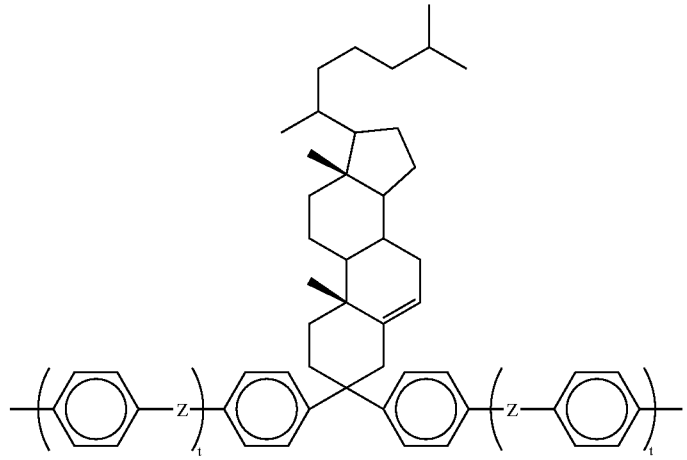

(5-2)

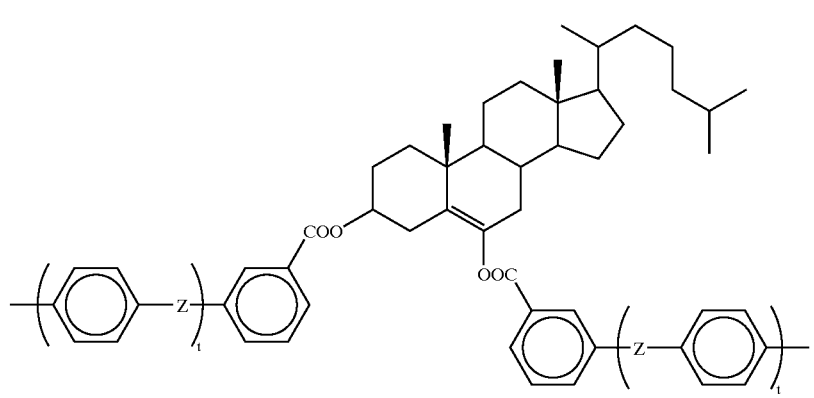

(5-3)

(5-4)

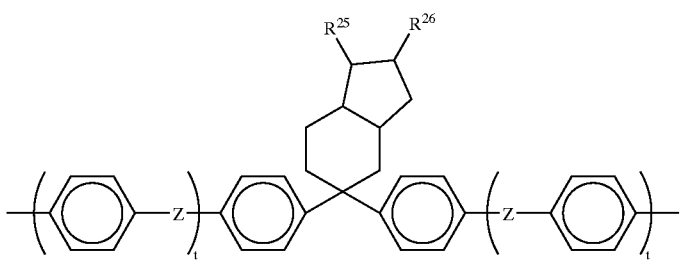

wherein $R^{13}$, $R^{25}$ and $R^{26}$ each independently represent hydrogen or a linear or branched alkyl of 1–12 carbon atoms, Y is methylene, ring A represents a benzene ring or a cyclohexane ring, z represents a single bond, $CH_2$, $CH_2CH_2$ or oxygen, r is an integer of 0–3, s is an integer of 0–5, and t is an integer of 0–3, provided that when t is 2 or 3, each Z may be the same or different from each other; any hydrogen on the benzene or cyclohexane ring may be replaced by an alkyl group of 1–4 carbon atoms; and the steroid skeleton in the formulas (5-2) and (5-3) may be the one wherein any ring is reduced, enlarged or cleaved, or contains a three-membered ring, the one wherein an unsaturated bond in any position is increased or decreased, or the one wherein hydrogen or alkyl in any position is replaced by any monovalent organic group;

(6)

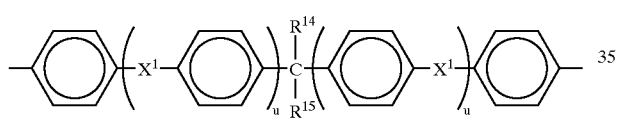

wherein $X^1$ represents a single bond, $CH_2$, $CH_2CH_2$ or oxygen, $R^{14}$ and $R^{15}$ each independently represent hydrogen, or an alkyl or perfluoroalkyl group having a linear or branched alkyl of 1–12 carbon atoms, but at least one of $R^{14}$ and $R^{15}$ represents an alkyl or perfluoroalkyl group having a linear or branched alkyl of 3 or more carbon atoms, and u is an integer of 0–3, provided that when u is 2 or 3, each $X^1$ may be the same or different from each other; and any hydrogen on the benzene ring may be replaced by an alkyl group of 1–4 carbon atoms;

(7)

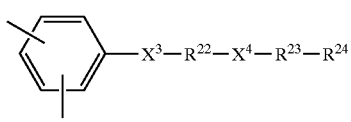

wherein $X^3$ and $X^4$ each independently represent a single bond, O, COO, OCO, NH, CONH or $(CH_2)_n$, $R^{22}$ and $R^{23}$ each independently represent a single bond, a group of 1–3 rings having an aromatic ring and/or an alicyclic ring (when $R^{22}$ and/or $R^{23}$ have 2 or 3 rings, these rings may be bonded with a single bond, O, COO, OCO, NH, CONH or $(CH_2)_n$), or a steroid group, $R^{24}$ represents hydrogen, fluorine, hydrocarbyl, fluorohydrocarbyl, alkoxy, cyano or OH, and n is an integer of 1–5; and (8)

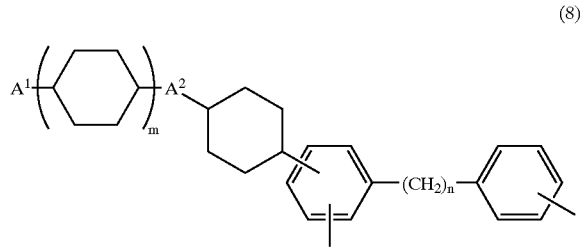

wherein $A^1$ is hydrogen or a linear or branched alkyl of 1–12 carbon atoms in which any non-adjacent methylene may be replaced by oxygen, $A^2$ is a single bond or an alkylene of 1–5 carbon atoms in which any non-adjacent methylene may be replaced by oxygen, m is an integer of 0–3, and n is an integer of 1–5.

(9) The varnish composition set forth in any one of the items (1) to (8), wherein in the soluble polyimide represented by formula (3), the tetravalent organic radical $R_5$ derived from tetracarboxylic acids is at least one tetravalent organic radical selected from the group consisting of a tetravalent organic radical derived from aromatic tetracarboxylic acids, a tetravalent organic radical derived from aliphatic tetracarboxylic acids and a tetravalent organic radical derived from alicyclic tetracarboxylic acids, and the divalent organic radical $R_6$ derived from a diamine is at least one divalent organic radical selected from the group consisting of a divalent organic radical derived from an aromatic diamine, a divalent organic radical derived from an alicyclic diamine, a divalent organic radical derived from an aliphatic diamine, and a divalent organic radical derived from a diamine containing two or more groups of aromatic, alicyclic and aliphatic groups.

(10) The varnish composition set forth in any one of the items (1) to (9), wherein in the soluble polyimide represented by formula (3), 1 to 100 mol % of the divalent organic radical $R_6$ derived from a diamine is a divalent organic radical derived from a diamine having a side chain of 3 or more carbon atoms.

(11) The varnish composition set forth in any one of the items (1) to (10), wherein in the soluble polyimide represented by formula (3), the tetravalent organic radical $R_5$ derived from tetracarboxylic acids is at least one radical selected from the group consisting of the radicals derived from tricarboxycyclopentyl acetic acids, 3,3,4-tricarboxy-1,2,3,4-tetrahydronaphthalene succinic acids, cyclobutane tetracarboxylic acids and butane tetracarboxylic acids, 1 to 100 mol % of the divalent organic radical $R_6$ derived from a diamine is at least one radical selected from the group consisting of the radicals represented by formulas (5-1), (5-2), (5-3), (5-4), (6), (7) and (8), and 99 to 0 mol % of said divalent organic radical is at least one radical selected from the group consisting of the radicals represented by the formula (4).

(12) A liquid crystal aligning agent using the varnish composition set forth in any one of the items (1) to (11).

(13) A liquid crystal display element having an aligning film formed using the liquid crystal aligning agent set forth in the item (12).

(14) The liquid crystal display element set forth in the item (13) using a liquid crystal composition comprising two or more compounds, which contains at least one compound selected from the group consisting of the compounds represented by formulas (9), (10) and (11), and at least one optically active compound as an optional component;

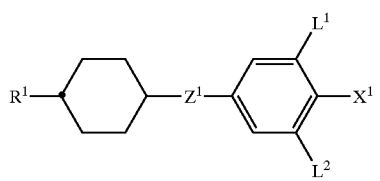
(9)

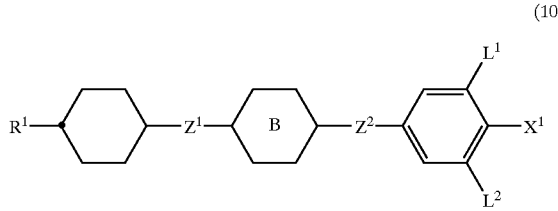
(10)

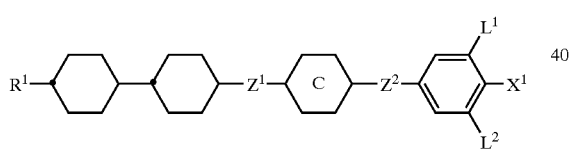
(11)

wherein $R^1$ represents a linear or branched alkyl of 1–10 carbon atoms in which any non-adjacent methylene may be replaced by —O— or —CH=CH— and any hydrogen may be replaced by fluorine; $X^1$ represents fluorine, chlorine, —OCF$_3$, —OCF$_2$H, —CF$_3$, —CF$_2$H, —CFH$_2$, —OCF$_2$CF$_2$H or —OCF$_2$CFHCF$_3$; $L^1$ and $L^2$ each independently represent hydrogen or fluorine; $Z^1$ and $Z^2$ each independently represent 1,2-ethylene, 1,4-butylene, —COO—, —CF$_2$O—, —OCF$_2$—, —CH=CH— or a single bond; ring B represents trans-1,4-cyclohexylene, 1,3-dioxane-2,5-diyl, or 1,4-phenylene in which hydrogen may be replaced by fluorine; and ring C represents tran-1,4-cyclohexylene or 1,4-phenylene in which hydrogen may be replaced by fluorine.

(15) The liquid crystal display element set forth in the item (13) using a liquid crystal composition comprising two or more compounds, which contains at least one compound selected from the group consisting of the compounds represented by formulas (12) and (13), and at least one optically active compound as an optional component;

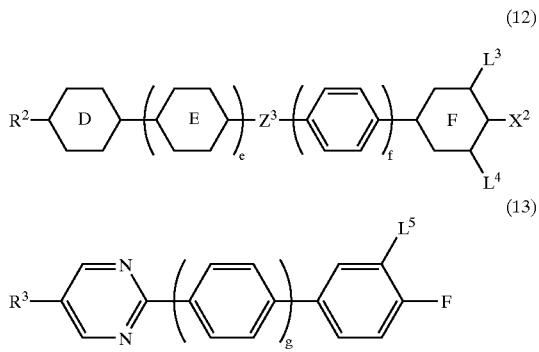

wherein $R^2$ and $R^3$ each independently represent a linear or branched alkyl group of 1–10 carbon atoms in which any non-adjacent methylene may be replaced by —O— or —CH=CH— and any hydrogen may be replaced by fluorine; $X^2$ represents —CN or —C≡C—CN; ring D represents trans-1,4-cyclohexylene, 1,4-phenylene, 1,3-dioxane-2,5-diyl or pyrimidine-2,5-diyl; ring E represents trans-1,4-cyclohexylene, pyrimidine-2,5-diyl or 1,4-phenylene in which hydrogen may be replaced by fluorine; ring F represents tran-1,4-cyclohexylene or 1,4-phenylene; $Z^3$ represents 1,2-ethylene, —COO— or a single bond; $L^3$, $L^4$ and $L^5$ each independently represent hydrogen or fluorine; and e, f and g each independently represent 0 or 1.

(16) The liquid crystal display element set forth in the item (13) using a liquid crystal composition comprising two or more compounds, which contains at least one compound selected from the group consisting of the compounds represented by formulas (14), (15) and (16), and at least one optically active compound as an optional component;

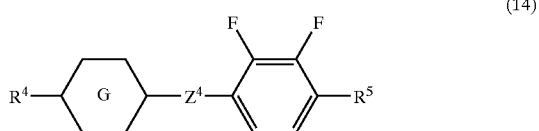
(14)

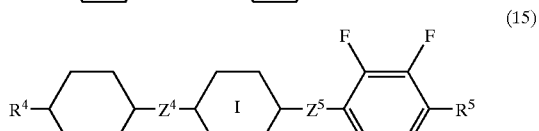
(15)

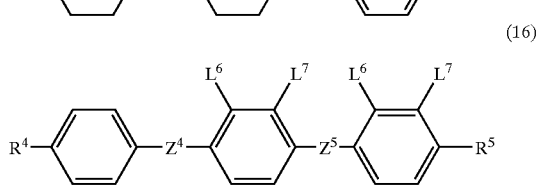
(16)

wherein $R^4$ and $R^5$ each independently represent a linear or branched alkyl group of 1–10 carbon atoms in which any non-adjacent methylene may be replaced by —O— or —CH=CH— and any hydrogen may be replaced by fluorine; rings G and I each independently represent trans-1,4-cyclohexylene or 1,4-phenylene; $L^6$ and $L^7$ each independently represent hydrogen or fluorine but do not represent hydrogen at the same time; and $Z^4$ and $Z^5$ each independently represent 1,2-ethylene, —COO— or a single bond.

(17) A liquid crystal display element set forth in the item (14) using a liquid crystal composition which comprises at least one compound selected from the group consisting of the compounds represented by formulas (9), (10) and (11) as a first component, at least one compound selected from the group consisting of the compounds represented by formulas (17), (18) and (19) as a second component, and at least one optically active compound as an optional third component;

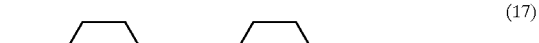

(17)

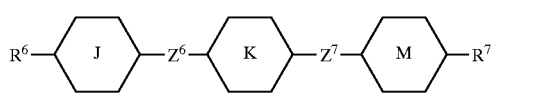

(18)

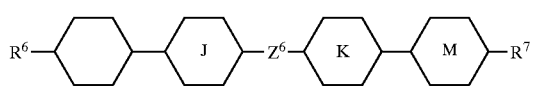

(19)

wherein $R^6$ and $R^7$ each independently represent a linear or branched alkyl group of 1–10 carbon atoms in which any non-adjacent methylene may be replaced by —O— or —CH=CH— and any hydrogen may be replaced by fluorine; rings J, K and M each independently represent trans-1,4-cyclohexylene, pyrimidine-2,5-diyl or 1,4-phenylene in which hydrogen may be replaced by fluorine; and $Z^6$ and $Z^7$ each independently represent 1,2-ethylene, —C≡C—, —COO—, —CH=CH— or a single bond.

(18) The liquid crystal display element set forth in the item (15) using a liquid crystal composition which comprises at least one compound selected from the group consisting of the compounds represented by formulas (12) and (13) as a first component, at least one compound selected from the group consisting of the compounds represented by formulas (17), (18) and (19) as a second component, and at least one optically active compound as an optional third component.

(19) The liquid crystal display element set forth in the item (16) using a liquid crystal composition which comprises at least one compound selected from the group consisting of the compounds represented by formulas (14), (15) and (16) as a first component, at least one compound selected from the group consisting of the compounds represented by formulas (17), (18) and (19) as a second component, and at least one optically active compound as an optional third component.

(20) The liquid crystal display element set forth in the item (14) using a liquid crystal composition which comprises at least one compound selected from the group consisting of the compounds represented by formulas (9), (10) and (11) as a first component, at least one compound selected from the group consisting of the compounds represented by formulas (12) and (13) as a second component, at least one compound selected from the group consisting of the compounds represented by formulas (17), (18) and (19) as a third component, and at least one optically active compound as an optional fourth component.

The varnish composition of the present invention comprises a polymer component containing a polyamic acid B represented by formula (1), a polyamic acid A represented by formula (2), and a soluble polyimide represented by formula (3), and a solvent for dissolving the polymer component, as a main component, and comprises 0.1 to 40% by weight of the polymer component. Especially when formed into the liquid crystal aligning film, such polymer composition can provide a liquid crystal aligning film with well-balanced electrical properties (in particular, excellent in preventing image sticking), coating property, alignment property, etc.

The present invention is further illustrated below.

The polyamic acid B represented by formula (1) is an ingredient having no side chain of 3 or more carbons, in the polymer component used in the varnish composition of the present invention. If the polyamic acid B is an ingredient having a side chain of 3 or more carbons like the other polymer component, it is difficult to have the effect of the present invention on electrical properties.

$R_1$ in the formula (1) represents a tetravalent organic radical derived from a tetracarboxylic acid, a tetracarboxylic dianhydride or a tetracarboxylic diacid dihalide (which are generally called "tetracarboxylic acids" in the present invention), which include a radical having no side chain, a radical having an alkyl side chain of less than 3 carbon atoms, or a mixture of these radicals. This $R_1$ can be selected broadly from tetravalent organic radicals of known tetracarboxylic acids. Preferably, a tetravalent organic radical derived from alicyclic tetracarboxylic acids is included in $R_1$, and more preferably this radical accounts for not less than 10 mol % of $R_1$.

For the aligning agent for TFT element, it is particularly preferred that a polymer having the tetravalent organic radical derived from alicyclic tetracarboxylic acids coexists with a polymer having the tetravalent organic radical derived from aromatic tetracarboxylic acids, which has an effect of improving display characteristics of liquid crystal display element (particularly, an effect of preventing image sticking and elevating voltage holding ratio). In this case, the molar ratio of the alicyclic system to the aromatic system is preferably in the range of 10/90 to 90/10, more preferably 70/30 to 10/90.

For the aligning agent for STN element, it is particularly preferred that a polymer having the tetravalent organic radical derived from alicyclic tetracarboxylic acids coexists with a polymer having the tetravalent organic radical derived from aliphatic tetracarboxylic acids, which can achieve a effect of reducing an electric current of the element and improving the reliability. In this case, the molar ratio of the alicyclic system to the aliphatic system is preferably in the range of 10/90 to 90/10, more preferably 70/30 to 30/70.

As a raw component constituting the organic radical derived from tetracarboxylic acids in the polyamic acid B, the following conventional known tetracarboxylic dianhydrides can be used.

Examples of alicyclic tetracarboxylic dianhydrides include cyclobutane tetracarboxylic dianhydride, cyclopentane tetracarboxylic dianhydride, bicycloheptane tetracarboxylic dianhydride, bicyclo[2,2,2]octo-7-ene-2,3,5,6-tetracarboxylic dianhydride, cyclohexane-1,2,5,6-tetracarboxylic dianhydride, 3,4-dicarboxy-1,2,3,4-5 tetrahydronaphthalene-1-succinic dianhydride, 3,3'-bicyclohexyl-1,1',2,2'-tetracarboxylic dianhydride, 2,3,5-tricarboxycyclopentylacetic dianhydride, 5-(2,5-dioxotetrahydrofural)-3-methyl-3-cyclohexene-1,2-dicarboxylic dianhydride, 1,3,3a,4,5,9b-hexahydro-5-tetrahydro-2,5-dioxo-3-furanyl)-naphtho[1,2,-c]-furan-1,3-dione, 3,5,6-tricarboxynorbornane-2-acetic dianhydride, 2,3,4,5-tetrahydrofuran tetracarboxylic dianhydride, tetracyclo[6.2.1$^{1,3}$.0$^{2,7}$]dodecane-4,5,9,10-tetracarboxylic dianhydride, and these compounds partially substituted with a lower alkyl group such as a methyl group and/or an ethyl group. Particularly preferable are cyclobutane tetracarboxylic dianhydride, cyclopentane tetracarboxylic dianhydride and cyclohexane tetracarboxylic dianhydride.

Examples of aromatic tetracarboxylic dianhydrides include pyromellitic dianhydride, 3,3',4,4'- benzophenonetetracarboxylic dianhydride, naphthalenetetracarboxylic dianhydrides (2,3,6,7-naphthalenetetracarboxylic dianhydride, etc.), 3,3',4,4'-diphenylmethanetetracarboxylic dianhydride, 3,3',4,4'-diphenylethanetetracarboxylic dianhydride, 3,3',4,4'-diphenylpropanetetracarboxylic dianhydride, 3,3',4,4'-diphenylsulfonetetracarboxylic dianhydride, 3,3',4,4'-diphenylethertetracarboxylic dianhydride, 3,3',4,4'-dimethyldiphenylsilanetetracarboxylic dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenylmethyl)diphenylmethane dianhydride, 4,4'-bis(3,4-dicarboxyphenylmethyl)diphenylethane dianhydride, 4,4'-bis(3,4-dicarboxyphenylmethyl)diphenylpropane dianhydride, 4,4'-bis(3,4-dicarboxyphenoxy)diphenylmethane dianhydride, 4,4'-bis(3,4-dicarboxyphenoxy)diphenylethane dianhydride, 4,4'-bis(3,4-dicarboxyphenoxy)diphenylpropane dianhydride, 3,3',4,4'-perfluoropropylidenediphthalic dianhydride, 3,3',4,4'-biphenyltetracarboxylic dianhydride, bis(phthalic)phenylsulfine oxide dianhydride, p-phenylene-bis(triphenylphthalic)dianhydride, m-phenylene-bis(triphenylphthalic)dianhydride, bis(triphenylphthalic)-4,4'-dephenylether dianhydride and bis(triphenylphthalic)-4,4'-diphenylmethane dianhydride. Particularly preferable are tetracarboxylic dianhydrides consisting of a phenyl group such as pyromellitic dianhydride, biphenyltetracarboxylic dianhydride and terphenyltetracarboxylic dianhydride, and tetracarboxylic dianhydrides consisting of a phenyl group and an aliphatic group (optionally including an alicyclic group) such as 2,2-diphenylpropanetetracarboxylic dianhydride. Moreover, preferable are tetracarboxylic dianhydrides which do not contain in the skeleton an oxygen or sulfur atom apt to reduce electrical properties of liquid crystal display element.

Examples of aliphatic tetracarboxylic dianhydrides used in combination with alicyclic tetracarboxylic acids can include ethane tetracarboxylic dianhydrides and butane tetracarboxylic dianhydrides. Butane tetracarboxylic dianhydrides in which one hydrogen may be replaced by other organic radical at the 2,3-position are also usable.

Combining pyromellitic dianhydride, which is a suitable example of the aromatic system, with cyclobutane tetracarboxylic dianhydride, which is a suitable example of the alicyclic tetracarboxylic dianhydride, can form a tetravalent organic radical derived from tetracarboxylic acids which is most typical constitution in the present invention, and which can constitute the polyamic acid B component especially suitable for an aligning agent for TFT. Further, combining butane tetracarboxylic dianhydride, which is one of suitable examples of the aliphatic system, with cyclobutane tetracarboxylic dianhydride can constitute the polyamic acid B component especially suitable for an aligning agent for STN.

$R_2$ in the formula (1) represents a divalent organic radical derived from diamines, which includes a radical having no side chain, a radical having an alkyl side chain of less than 3 carbon atoms or the mixture of these radicals. Among diamino compounds providing such radicals, examples of compounds having no side chain can include the following compounds.

For example, they may be aromatic diamines such as 4,4'-diaminodiphenylether, 4,4'-diaminodiphenylsulfide, 4,4'-diaminodiphenylsulfone, 4,4'-diaminobiphenyl, 3,3'-dimethoxybenzidine, 4,4'-diaminobenzanilide, 1,5-diaminonaphthalene, 3,3'-diaminobenzophenone, 3,4'-diaminobenzophenone, 4,4'-diaminobenzophenone, 1,4-bis(4-aminophenoxy)benzene, 1,3-bis(4-aminophenoxy)benzene, 2,2-bis(4-aminophenoxy)propane, 2,2-bis[4-(4-aminophenoxy)phenyl]propane, bis[4-(4-aminophenoxy)phenyl]sulfone, bis[4-(4-aminophenoxy)phenyl]sulfide, bis [4-(4-aminophenoxy)phenyl]methane, 2,7-diaminofluorene, 9,9-bis(4-aminophenyl)fluorene, 9,10-bis(4-aminophenyl)anthracene, 4,4'-(1,4-phenylenediisopropylidene)bisaniline, 4,4'-(1,3-phenylenediisopropylidene)bisaniline, p-xylylenediamine, m-xylylenediamine; aliphatic diamines such as ethylenediamine, propylenediamine, tetramethylenediamine, pentamethylenediamine, hexamethylenediamine, heptamethylenediamine, octamethylenediamine, nonamethylenediamine and heptamethylenediamine; alicyclic diamines such as 1,4-diaminocyclohexane, 1,3-diaminocyclobutane, 1,4-bis(aminomethyl)cyclohexane, 4,4'-diaminodicyclohexylmethane, 4,4'-diaminodicyclohexylethane, isophoronediamine, norbornanediamine, tetrahydrodicyclopentadienylenediamine, hexahydro-4,7-methanoindanylenedimethylenediamine and tricyclo[6.2.1.0$^{2,7}$]-undecylenedimethyldiamine; and heterocyclic diamines such as 2,3-diaminopyridine, 2,6-diaminopyridine, 3,4-diaminopyridine, 2,4-diaminopyridine, diaminopyrimidine and diaminopiperazine; and the like.

The divalent organic radical derived from diamines can be formed by extensively using known diamino compounds, but it is preferably at least one divalent organic radical selected from the group consisting of a divalent organic radical derived from aromatic diamines, a divalent organic radical derived from alicyclic diamines, and a divalent organic radical derived from diamines containing two or more of aromatic, alicyclic and aliphatic groups, and moreover, it is preferably a divalent organic radical of the structure which does not contain ester and ether groups, etc., because oxygen tends to cause the lowered electrical properties of liquid crystal display element.

Typical diamines providing such a divalent organic radical can include compounds represented by formula (20), a part of which is included in the above-listed compounds.

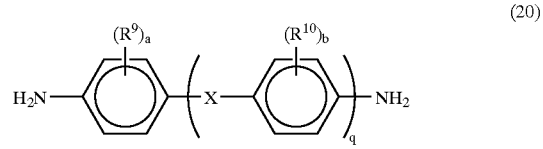

(20)

wherein X represents a single bond, $CH_2$, $CH_2CH_2$, $CH_2CH_2CH_2$, $CH_2CH_2CH_2CH_2$, or $C(CH_3)_2$, $R^9$ and $R^{10}$ each independently represent hydrogen or alkyl group of less than 3 carbon atoms (preferably, methyl), a and b are individually an integer of 1 or 2, and q is an integer of 0–3, provided that when q is 2 or 3, each X may be the same or different form each other.

Specific examples of the diamines represented by formula (20) are the followings but not limited thereto.

In the case that q is 0, examples may be p-phenylenediamine, m-phenylenediamine, o-phenylenediamine, etc. In the case that q is 1, examples may be 4,4'-diaminobiphenyl, 4,4'-diaminodiphenylmethane, 4,4'-diaminodiphenylethane, 3,3'-dimethylbenzidine, 1,3-bis(4-aminophenyl)propane, 2,2-bis(4-aminophenyl)propane, bis(4-amino-3-methylphenyl)methane, bis(4-amino-2-methylphenyl)methane, 1,2-bis(4-amino-3-methylphenyl)ethane, 1,3-bis(4-amino-3-methylphenyl)propane, 1,2-bis(4-amino-2-methylphenyl)ethane, 1,3-bis(4-amino-2-methylphenyl)propane, etc. In the case that q is 2, examples may be 1,4-bis(4-aminophenyl)benzene, 1,4-bis[(4-aminophenyl)methyl]benzene, 1,4-bis[(3-aminophenyl)methyl]-benzene, 1,4-bis[(4-aminophenyl)ethyl]benzene, 1,4-bis[(3-aminophenyl)ethyl]benzene, 1,4-bis[(4-amino-3-methylphenyl)methyl]benzene, 1,4-bis[(4-amino-3-methylphenyl)ethyl]benzene, etc. In the case that q is 3, examples may be 4,4'-(4-aminophenyl)biphenyl, bis[(4-(4-aminophenylmethyl) phenyl]methane, bis[(4-(4-aminophenylmethyl)phenyl] ethane, bis[(4-(3-aminophenylmethyl)phenyl]methane, bis [(4-(3-aminophenylmethyl)phenyl]ethane, 2,2-bis[(4-(4-aminophenylmethyl)phenyl]propane, 2,2-bis[(4-(3-aminophenylmethyl)phenyl]propane, etc.

The polyamic acid B represented by formula (1) is prepared by reacting the above-mentioned tetracarboxylic acids and diamines as starting materials. In this reaction, in addition to the above starting materials, there can be used together dicarboxylic anhydrides and/or monoamine compounds to form a terminal group in the polyamic acid; and aminosilicon compounds, diaminosilicon compounds, diaminosiloxane compounds, etc. which are effectively used for improving an adhesion of a liquid crystal aligning film to a substrate.

Specific examples of such aminosilicon compounds can include p-aminophenyltrimethoxysilane, p-aminophenyltriethoxysilane, m-aminophenyltrimethoxysilane, m-aminophenyltriethoxysilane, aminopropyltrimethoxysilane and aminopropyltriethoxysilane. Specific examples of diaminosilicon compounds can include 1,3-bis(3-aminopropyl)-1,1,3,3-tetraphenyldisiloxane, 1,3-bis(3-aminopropyl)-1,1,3,3-tetramethyldisiloxane and 1,3-bis(4-aminobutyl)-1,1,3,3-tetramethyldisiloxane. These compounds can be used in the polyamic acid A or soluble polyimide which will be mentioned later.

The tetravalent organic radicals derived from tetracarboxylic acids in the polyamic acid A represented by formula (2) preferably comprise aromatic and/or alicyclic radicals as an essential component, which may be combined with a radical derived from aliphatic (linear) tetracarboxylic acids. Since the aliphatic component (linear) may do damage to the alignment property of liquid crystal, however, it should be used together insofar as it does not cause trouble to the alignment property of liquid crystal.

For the radicals of these tetracarboxylic acids, the structure not containing an oxygen or sulfur atom in the skeleton is preferable. However, when the amount of polyamic acid A added is not much, this structure may contain such an atom, since the influence becomes small. In this respect, tetracarboxylic acids usable for the production of polyamic acid A can be selected from the range broader than tetracarboxylic acids usable for the production of polyamic acid B. More specifically, they include the tetracarboxylic acids which have been recited as an example usable for the production of polyamic acid B.

Since polyamic acid A is required to have a function of giving a larger pretilt angle to the liquid crystal, it is necessary that $R_3$ (tetravalent organic radical derived from tetracarboxylic acids), $R_4$ (divalent organic radical derived from a diamine) or both in the formula (2) have the composition containing a radical having a side chain of 3 or more carbon atoms.

The side chains of 3 or more carbon atoms can include aliphatic hydrocarbons, hydrocarbons containing an alicyclic structure, aromatic hydrocarbons, groups having a siloxane group, groups having a steroid skeleton or these combined groups, etc. More specifically, a side chain represented by formula (21) is recited.

$$-X^3-R^{22}-X^4-R^{23}-R^{24} \quad (21)$$

wherein $X^3$ and $X^4$ each independently represent a single bond, O, COO, OCO, NH, CONH or $(CH_2)_n$, $R^{22}$ and $R^{23}$ each independently represent a single bond, a group of 1–3 rings having an aromatic ring and/or an alicyclic ring (when $R^{22}$ and/or $R^{23}$ have 2 or 3 rings, these rings may be linked with a single bond, O, COO, OCO, NH, CONH or $(CH_2)_n$), or a steroid group, $R^{24}$ represents hydrogen, fluorine, hydrocarbyl, fluorohydrocarbyl, alkoxy, cyano or OH, and n is an integer of 1–5.

A part of hydrocarbyl may be replaced by other atoms such as oxygen, but preferably it does not contain a group having an oxygen or sulfur atom such as O, CO, COO, S and SOO. The alicyclic hydrocarbyl and aromatic hydrocarbyl may have a substituent such as alkyl, alkoxy, halogen and OH. Steroid skeletons in the steroid group can include choresteryl, androsteryl, β-choresteryl, epiandrosteryl, erygosteryl, estryl, 11α-hydroxymethylsteryl, 11α-progesteryl, lanosteryl, melatolanyl, methyltestorosteryl, norethisteryl, pregnenonyl, β-sitosteryl, stigmasteryl, testosteryl and cholesterol acetic esters.

As diamines used in the production of polyamic acid A, the above-mentioned diamino compounds for the production of polyamic acid B can also be used when an organic radical derived from tetracarboxylic acids has a side chain of 3 or more carbon atoms. They may be used in combination with diamines having a side chain of 3 or more carbon atoms. When an organic radical derived form tetracarboxylic acids does not have a side chain of 3 or more carbon atoms, it is necessary to use diamines having a side chain of 3 or more carbon atoms.

Diamino compounds providing the radical having such a side chain include diamino compounds represented by the following formulas (22-1) to (25).

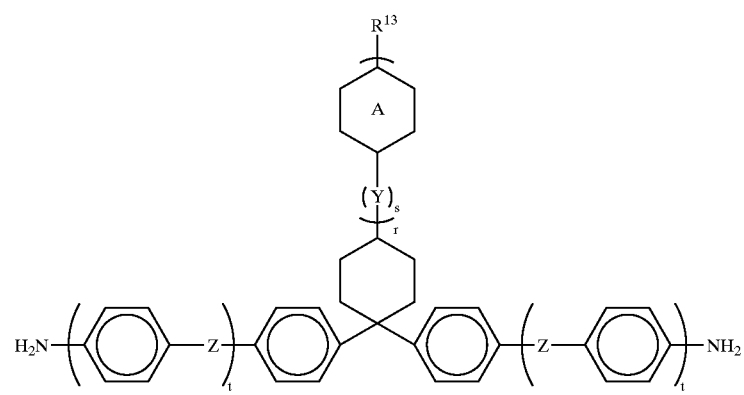

(22-1)

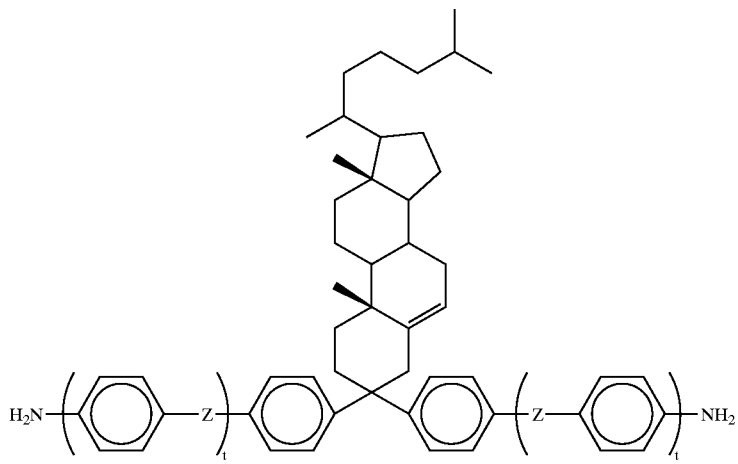

(22-2)

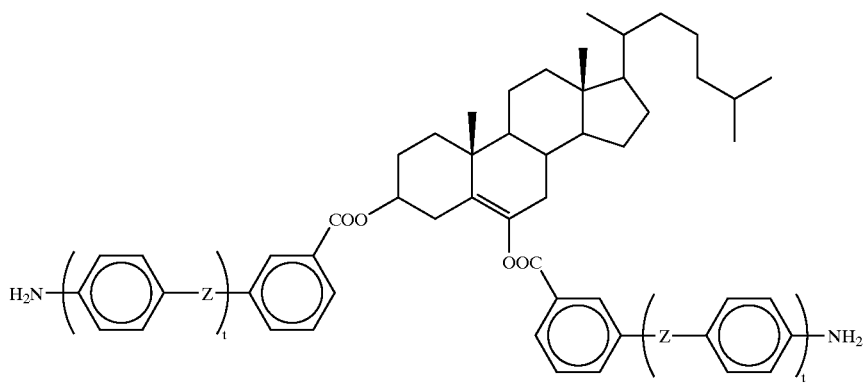

(22-3)

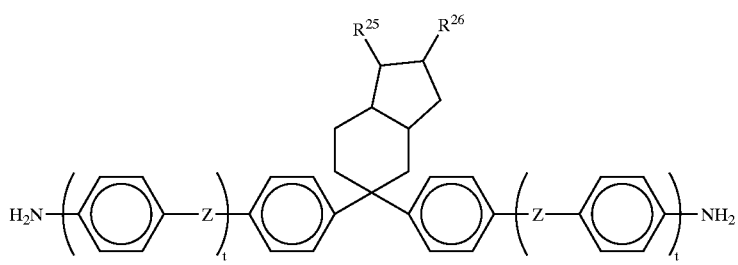

(22-4)

wherein $R^{13}$, $R^{25}$ and $R^{26}$ each independently represent hydrogen or a linear or branched alkyl of 1–12 carbon atoms, Y is methylene, ring A represents a benzene ring or a cyclohexane ring, Z represents a single bond, $CH_2$, $CH_2CH_2$ or oxygen, r is an integer of 0–3, s is an integer of 0–5, t is an integer of 0–3, provided that when t is 2 or 3, each Z may be the same or different from each other. Further, any hydrogen on the benzene or cyclohexane ring may be replaced by an alkyl group of 1–4 carbon atoms. The steroid skeleton in the formulas (22-2) and (22-3) may be the skeleton wherein any ring is reduced, enlarged or cleaved, or contains a three-membered ring, the skeleton wherein an unsaturated bond in any position is increased or decreased, or the skeleton wherein hydrogen or alkyl in any position is replaced by any monovalent organic group.

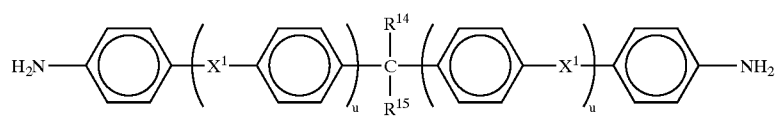

(23)

wherein $X^1$ represents a single bond, $CH_2$, $CH_2CH_2$ or oxygen, $R^{14}$ and $R^{15}$ each independently represent hydrogen, or an alkyl or perfluoroalkyl group having a linear or branched alkyl of 1–12 carbon atoms, but at least one of $R^{14}$ and $R^{15}$ represents an alkyl or perfluoroalkyl group having a linear or branched alkyl of 3 or more carbon atoms, and u is an integer of 0–3, provided that when u is 2 or 3, each $X^1$ may be the same or different from each other. Further, any hydrogen on the benzene ring may be replaced by an alkyl group of 1–4 carbon atoms.

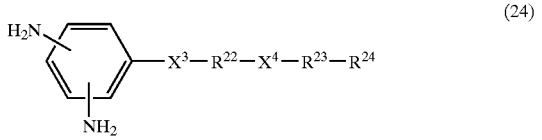

(24)

wherein $X^3$ and $X^4$ each independently represent a single bond, O, COO, OCO, NH, CONH or $(CH_2)_n$, $R^{22}$ and $R^{23}$ each independently represent a single bond, a group of 1–3 rings having an aromatic ring and/or an alicyclic ring (when $R^{22}$ and/or $R^{23}$ have 2 or 3 rings, these rings may be bonded with a single bond, O, COO, OCO, NH, CONH or $(CH_2)_n$), or a steroid group, $R^{24}$ represents hydrogen, fluorine, hydrocarbyl, fluorohydrocarbyl, alkoxy, cyano or OH, and n is an integer of 1–5. Examples of the steroid groups in the formulas (5-2), (5-3), (7), (22-2), (22-3) and (24) can include the same groups as mentioned for the formula (21) illustrating the side chain of 3 or more carbon atoms.

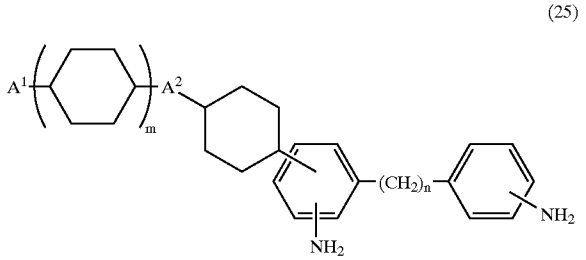

(25)

wherein $A^1$ is hydrogen or a linear or branched alkyl group of 1–12 carbon atoms in which any non-adjacent methylene may be replaced by oxygen, $A^2$ is a single bond or an alkylene of 1–5 carbons in which any non-adjacent methylene may be replaced by oxygen, m is an integer of 0–3 and n is an integer of 1–5.

The followings are compounds represented by the formula (22-1) as examples of such diamino compounds.

The compounds wherein Z=oxygen, r=0 and t=1 include, for example, 1,1-bis[4-(4-aminophenoxy)phenyl]cyclohexane, 1,1-bis[4-(4-aminophenoxy)phenyl]-4-methylcyclohexane, 1,1-bis[4-(4-aminophenoxy)phenyl]-4-ethylcyclohexane, 1,1-bis[4-(4-aminophenoxy)phenyl]-4-n-propylcyclohexane, 1,1-bis[4-(4-aminophenoxy)phenyl]-4-n-butylcyclohexane, 1,1-bis[4-(4-aminophenoxy)phenyl]-4-n-pentylcyclohexane, 1,1-bis[4-(4-aminophenoxy)phenyl]-4-n-hexylcyclohexane, 1,1-bis[4-(4-aminophenoxy)phenyl]-4-n-heptylcyclohexane, 1,1-bis[4-(4-aminophenoxy)phenyl]-4-n-octylcyclohexane, 1,1-bis[4-(4-aminophenoxy)phenyl]-4-n-nonylcyclohexane, 1,1-bis[4-(4-aminophenoxy)phenyl]-4-n-decylcyclohexane, 1,1-bis[4-(4-aminophenoxy)phenyl]-4-n-decylcyclohexane, 1,1-bis[4-(4-aminophenoxy)phenyl]-4-n-decylcyclohexane, 1,1-bis[4-(4-aminophenoxy)phenyl]-4-n-decylcyclohexane, 1,1-bis[4-(4-aminophenoxy)phenyl]-4-n-tetradecylcyclohexane and 1,1-bis[4-(4-aminophenoxy)phenyl]-4-n-pentadecylcyclohexane.

The compounds wherein r=0 and t=0 include, for example, 1,1-bis(4-aminophenyl)cyclohexane, 1,1-bis(4-aminophenyl)-4-methylcyclohexane, 1,1-bis(4-aminophenyl)-4-ethylcyclohexane, 1,1-bis(4-aminophenyl)-4-n-propylcyclohexane, 1,1-bis(4-aminophenyl)-4-n-butylcyclohexane, 1,1-bis(4-aminophenyl)-4-n-pentylcyclohexane, 1,1-bis(4-aminophenyl)-4-n-hexylcyclohexane, 1,1-bis(4-aminophenyl)-4-n-heptylcyclohexane, 1,1-bis(4-aminophenyl)-4-n-octylcyclohexane, 1,1-bis(4-aminophenyl)-4-n-nonylcyclohexane, 1,1-bis(4-aminophenyl)-4-n-decylcyclohexane, 1,1-bis(4-aminophenyl)-4-n-undecylcyclohexane, 1,1-bis(4-aminophenyl)-4-n-dodecylcyclohexane, 1,1-bis(4-aminophenyl)-4-n-tridecylcyclohexane, 1,1-bis(4-aminophenyl)-4-n-tetradecylcyclohexane and 1,1-bis(4-aminophenyl)-4-n-pentadecylcyclohexane.

The compounds wherein ring A=cyclohexyl, r=1, s=0 and t=0 include, for example, 1,1-bis(4-aminophenyl)-4-cyclohexylcyclohexane, 1,1-bis(4-aminophenyl)-4-(4-methyl-trans-cyclohexyl)cyclohexane, 1,1-bis(4-aminophenyl)-4-(4-ethyl-trans-cyclohexyl)cyclohexane, 1,1-bis(4-aminophenyl)-4-(4-n-propyl-trans-cyclohexyl)cyclohexane, 1,1-bis(4-aminophenyl)-4-(4-n-butyl-trans-cyclohexyl)cyclohexane, 1,1-bis(4-aminophenyl)-4-(4-n-pentyl-trans-cyclohexyl)cyclohexane, 1,1-bis(4-aminophenyl)-4-(4-n-hexyl-trans-cyclohexyl)cyclohexane, 1,1-bis(4-aminophenyl)-4-(4-n-heptyl-trans-cyclohexyl)cyclohexane, 1,1-bis(4-aminophenyl)-4-(4-n-octyl-trans-cyclohexyl)cyclohexane, 1,1-bis(4-aminophenyl)-4-(4-n-nonyl-trans-cyclohexyl)cyclohexane, 1,1-bis(4-aminophenyl)-4-(4-n-decyl-trans-cyclohexyl)cyclohexane, 1,1-bis(4-aminophenyl)-4-(4-n-undecyl-trans-cyclohexyl)cyclohexane, 1,1-bis(4-aminophenyl)-4-(4-n-docecyl-trans-cyclohexyl)cyclohexane, 1,1-bis(4-aminophenyl)-4-(4-n-tridecyl-trans-cyclohexyl)cyclohexane, 1,1-bis(4-aminophenyl)-4-(4-n-tetradecyl-trans-cyclohexyl)cyclohexane and 1,1-bis(4-aminophenyl)-4-(4-n-pentadecyl-trans-cyclohexyl)cyclohexane.

The compounds wherein ring A=cyclohexyl, Z=oxygen, r=1, s=0 and t=1 include, for example, 1,1-bis[4-(4-aminophenoxy)phenyl]-4-(cyclohexyl)cyclohexane, 1,1-bis[4-(4-aminophenoxy)phenyl]-4-(4-methylcyclohexyl)cyclohexane, 1,1-bis[4-(4-aminophenoxy)phenyl]-4-(4-ethylcyclohexyl)cyclohexane, 1,1-bis[4-(4-aminophenoxy)phenyl]-4-(4-propylcyclohexyl)cyclohexane, 1,1-bis[4-(4-aminophenoxy)phenyl]-4-(4-butylcyclohexyl)cyclohexane, 1,1-bis[4-(4-aminophenoxy)phenyl]-4-(4-pentylcyclohexyl)cyclohexane, 1,1-bis[4-(4-aminophenoxy)phenyl]-4-(4-hexylcyclohexyl)cyclohexane, 1,1-bis[4-(4-aminophenoxy)phenyl]-4-(4-heptylcyclohexyl)cyclohexane and 1,1-bis[4-(4-aminophenoxy)phenyl]-4-(4-octylcyclohexyl)cyclohexane.

The compounds wherein ring A=cyclohexyl, r=1, s=1 and t=0 include, for example, 1,1-bis(4-aminophenyl)-4-(cyclohexylmethyl)cyclohexane, 1,1-bis(4-aminophenyl)-4-[(4-methylcyclohexyl)methyl]cyclohexane, 1,1-bis(4-aminophenyl)-4-[(4-ethylcyclohexyl)methyl]cyclohexane, 1,1-bis(4-aminophenyl)-4-[(4-propylcyclohexyl)methyl]cyclohexane, 1,1-bis(4-aminophenyl)-4-[(4-butylcyclohexyl)methyl]cyclohexane, 1,1-bis(4-aminophenyl)-4-[(4-pentylcyclohexyl)methyl]cyclohexane, 1,1-bis(4-aminophenyl)-4-[(4-hexylcyclohexyl)methyl]cyclohexane, 1,1-bis(4-aminophenyl)-4-[(4-heptylcyclohexyl)methyl]cyclohexane and 1,1-bis(4-aminophenyl)-4-[(4-octylcyclohexyl)methyl]-cyclohexane.

The compounds wherein ring A=phenyl, Z=oxygen, r=1, s=1 and t=1 include, for example, 1,1-bis[4-(4-aminophenoxy)phenyl]-4-(phenylmethyl)cyclohexane, 1,1-bis[4-(4-aminophenoxy)phenyl]-4-[(4-methylphenyl)methyl]cyclohexane, 1,1-bis[4-(4-aminophenoxy)phenyl]-4-[(4-ethylphenyl)methyl]cyclohexane, 1,1-bis[4-(4-aminophenoxy)phenyl]-4-[(4-propylphenyl)methyl]cyclohexane, 1,1-bis[4-(4-aminophenoxy)phenyl]-4-[(4-butylphenyl)methyl]cyclohexane, 1,1-bis[4-(4-aminophenoxy)phenyl]-4-[(4-pentylphenyl)methyl]cyclohexane, 1,1-bis[4-(4-aminophenoxy)phenyl]-4-[(4-hexylphenyl)methyl]cyclohexane, 1,1-bis[4-(4-aminophenoxy)phenyl]-4-[(4-heptylphenyl)methyl]cyclohexane and 1,1-bis[4-(4-aminophenoxy)phenyl]-4-[(4-octylphenyl)methyl]-cyclohexane.

The compounds wherein ring A=phenyl, r=1, s=1 and t=0 include, for example, 1,1-bis(4-aminophenyl)-4-(phenylmethyl)cyclohexane, 1,1-bis(4-aminophenyl)-4-[(4-methylphenyl)methyl]cyclohexane, 1,1-bis(4-aminophenyl)-4-[(4-ethylphenyl)methyl]cyclohexane, 1,1-bis(4-aminophenyl)-4-[(4-propylphenyl)methyl]cyclohexane, 1,1-bis(4-aminophenyl)-4-[(4-butylphenyl)methyl]cyclohexane, 1,1-bis(4-aminophenyl)-4-[(4-pentylphenyl)methyl]cyclohexane, 1,1-bis(4-aminophenyl)-4-[(4-hexylheenyl)methyl]cyclohexane, 1,1-bis(4-aminophenyl)-4-[(4-heptylphenyl)methyl]cyclohexane and 1,1-bis(4-aminophenyl)-4-[(4-octylphenyl)methyl]cyclohexane.

The compounds wherein ring A=phenyl, Z=CH$_2$, r=1, s=1 and t=1 include, for example, 1,1-bis{4-[(4-aminophenyl)methyl]phenyl}-4-(phenylmethyl)cyclohexane, 1,1-bis{4-[(4-aminophenyl)methyl]phenyl}-4-[(4-methylphenyl)methyl]cyclohexane, 1,1-bis{4-[(4-aminophenyl)methyl]phenyl}-4-[(4-ethylphenyl)methyl]cyclohexane, 1,1-bis{4-[(4-aminophenyl)methyl]phenyl}-4-[(4-propylphenyl)methyl]cyclohexane, 1,1-bis{4-[(4-aminophenyl)methyl]phenyl}-4-[(4-butylphenyl)methyl]cyclohexane, 1,1-bis{4-[(4-aminophenyl)methyl]phenyl}-4-[(4-pentylphenyl)methyl]cyclohexane, 1,1-bis{4-[(4-aminophenyl)methyl]phenyl}-4-[(4-hexylphenyl)methyl]cyclohexane, 1,1-bis{4-[(4-aminophenyl)methyl]phenyl}-4-[(4-heptylphenyl)methyl]cyclohexane and 1,1-bis{4-[(4-aminophenyl)methyl]phenyl}-4-[(4-octylphenyl)methyl]cyclohexane.

The compounds wherein Z=CH$_2$, r=0 and t=1 include, for example, 1,1-bis{4-[(4-aminophenyl)methyl]phenyl}cyclohexane, 1,1-bis{4-[(4-aminophenyl)methyl]phenyl}-4-methylcyclohexane, 1,1-bis{4-[(4-aminophenyl)methyl]phenyl}-4-ethylcyclohexane, 1,1-bis{4-[(4-aminophenyl)methyl]phenyl}-4-propylcyclohexane, 1,1-bis{4-[(4-aminophenyl)methyl]phenyl}-4-butylcyclohexane, 1,1-bis{4-[(4-aminophenyl)methyl]phenyl}-4-pentylcyclohexane, 1,1-bis{4-[(4-aminophenyl)methyl]phenyl}-4-hexylcyclohexane, 1,1-bis{4-[(4-aminophenyl)methyl]phenyl}-4-heptylcyclohexane and 1,1-bis(4-((4-aminophenyl)methyl)phenyl)-4-octylcyclohexane.

The compounds wherein ring A=cyclohexyl, Z=CH$_2$, r=1, t=1 and s=2 include, for example, 1,1-bis{4-[(4-aminophenyl)methyl]phenyl}-4-[2-(cyclohexylethylcyclohexane, 1,1-bis{4-[(4-aminophenyl)methyl]phenyl}-4-[2-(4-methyl-trans-cyclohexyl)ethyl]cyclohexane, 1,1-bis{4-[(4-aminophenyl)methyl]phenyl}-4-[2-(4-ethyl-trans-cyclohexyl)ethyl]cyclohexane, 1,1-bis{4-[(4-aminophenyl)methyl]phenyl}-4-[2-(4-propyl-trans-cyclohexyl)ethyl]cyclohexane, 1,1-bis{4-[(4-aminophenyl)methyl]phenyl}-4-[2-(4-butyl-trans-cyclohexyl)ethyl]cyclohexane, 1,1-bis{4-[(4-aminophenyl)methyl]phenyl}-4-[2-(4-pentyl-trans-cyclohexyl)ethyl]cyclohexane, 1,1-bis{4-[(4-aminophenyl)methyl]phenyl}-4-[2-(4-amyl-trans-cyclohexyl)ethyl]cyclohexane, 1,1-bis{4-[(4-aminophenyl)methyl]phenyl}-4-[2-(4-hexyl-trans-cyclohexyl)ethyl]cyclohexane, 1,1-bis{4-[(4-aminophenyl)methyl]phenyl}-4-[2-(4-heptyl-trans-cyclohexyl)ethyl]cyclohexane, 1,1-bis{4-[(4-aminophenyl)methyl]phenyl}-4-[2-(4-octyl-trans-cyclohexyl)ethyl]cyclohexane, 1,1-bis{4-[(4-aminophenyl)methyl]phenyl}-4-[2-(4-nonyl-trans-cyclohexyl)ethyl]cyclohexane and 1,1-bis{4-[(4-aminophenyl)methyl]phenyl}-4-[2-(4-dodecyl-trans-cyclohexyl)ethyl]cyclohexane.

Next, the followings are examples of diamino compounds represented by the formula (23).

The compounds wherein $X^1$=O (oxygen) and u=1 include, for example, 2,2-bis[4-(4-aminophenoxy)phenyl]pentane, 2,2-bis[4-(4-aminophenoxy)phenyl]hexane, 2,2-bis[4-(4-aminophenoxy)phenyl]heptane, 2,2-bis[4-(4-aminophenoxy)phenyl]octane, 2,2-bis[4-(4-aminophenoxy)phenyl]nonane, 2,2-bis[4-(4-aminophenoxy)phenyl]decane, 2,2-bis[4-(4-aminophenoxy)phenyl]undecane, 2,2-bis[4-(4-aminophenoxy)phenyl]dodecane, 2,2-bis[4-(4-aminophenoxy)phenyl]tridecane, 2,2-bis[4-(4-aminophenoxy)phenyl]tetradecane, 2,2-bis[4-(4-aminophenoxy)phenyl]pentadecane, 2,2-bis[4-(4-aminophenoxy)phenyl]hexadecane, 2,2-bis[4-(4-aminophenoxy)phenyl]heptadecane, 2,2-bis[4-(4-aminophenoxy)phenyl]octadecane and 2,2-bis[4-(4-aminophenoxy)phenyl]nonadecane.

The compounds wherein $X^1$=CH$_2$ and u=1 include, for example, 2,2-bis{4-[(4-aminophenyl)methyl]phenyl}pentane, 2,2-bis{4-[(4-aminophenyl)methyl]phenyl}hexane, 2,2-bis{4-[(4-aminophenyl)methyl]phenyl}heptane, 2,2-bis{4-[(4-aminophenyl)methyl]phenyl}octane, 2,2-bis{4-[(4-aminophenyl)methyl]phenyl}nonane, 2,2-bis{4-[(4-aminophenyl)methyl]phenyl}decane, 2,2-bis{4-[(4-aminophenyl)methyl]phenyl}undecane, 2,2-bis{4-[(4-aminophenyl)methyl]phenyl}dodecane, 2,2-bis{4-[(4-aminophenyl)methyl]phenyl}tridecane, 2,2-bis{4-[(4-aminophenyl)methyl]phenyl}tetradecane, 2,2-bis{4-[(4-aminophenyl)methyl]phenyl}pentadecane, 2,2-bis{4-[(4-aminophenyl)methyl]phenyl}hexadecane, 2,2-bis{4-[(4-aminophenyl)methyl]phenyl}heptadecane, 2,2-bis{4-[(4-aminophenyl)methyl]phenyl}octadecane, 2,2-bis{4-[(4-aminophenyl)methyl]phenyl}nonadecane, 2,2-bis{4-[(4-aminophenyl)methyl]phenyl}perfluoropentane, 2,2-bis{4-[(4-aminophenyl)methyl]phenyl}perfluorohexane, 2,2-bis{4-[(4-aminophenyl)methyl]phenyl}perfluoroheptane, 2,2-bis{4-[(4-aminophenyl)methyl]phenyl}perfluorooctane, 2,2-bis{4-[(4-aminophenyl)methyl]phenyl}perfluorononane, 2,2-bis{4-[(4-aminophenyl)methyl]phenyl}perfluorodecane, 2,2-bis{4-[(4-aminophenyl)methyl]phenyl}perfluoroundecane, 2,2-bis{4-[(4-aminophenyl)methyl]phenyl}perfluorododecane, 2,2-bis{4-[(4-aminophenyl)methyl]phenyl}perfluorotridecane, 2,2-bis{4-[(4-aminophenyl)methyl]phenyl}perfluorotetradecane, 2,2-bis{4-[(4-aminophenyl)methyl]phenyl}perfluoropentadecane, 2,2-bis{4-[(4-aminophenyl)methyl]phenyl}perfluorohexadecane, 2,2-bis{4-[(4-aminophenyl)methyl]phenyl}perfluoroheptadecane, 2,2-bis{4-[(4-aminophenyl)methyl]phenyl}perfluorooctadecane and 2,2-bis{4-[(4-aminophenyl)methyl]phenyl}perfluorononadecane.

The above compounds are examples of 2,2-bis substituted system. It goes without saying that 1,1-bis substituted, 3,3-bis substituted, 4,4-bis substituted or 5,5-bis substituted compounds can be included as well.

Diamino compounds represented by the formula (24) can include 4-[8-(4-biphenyloxy)octyloxy]-1,3-diaminobenzene, 4-[3-(4-cyanobiphenyl-4'-oxy)propoxy]-1,3-diaminobenzene, 4-[12-(4-cyanobiphenyl-4'-oxy)dodecyloxy]-1,3-diaminobenzene, 4-[6-(4-methoxybiphenyl-4'-oxy)hexyloxy]-1,3-diaminobenzene, 4-[3-(4-fluorobiphenyl-4'-oxy)propoxy]-1,3-diaminobenzene, 1,4-diamino-3-[4-(4-alkylcyclohexyl)cyclohexyloxy]benzene, 1,4-diamino-3-[4-(4-alkylphenyl)cyclohexyloxy]benzene, 1,4-diamino-3-((4-alkylterphenyl)oxy)benzene, 1,4-diamino-(2-alkyl)benzene, 1,4-diamino-(2,5-dialkyl)benzene and 2-alkyloxy-1,4-diaminobenzene, dodecyl 2,4-diaminobenzoate, octyl 2,4-diaminobenzoate, and 1,5-diamino-2-octyloxycarbonylaminobenzene.

The diamino compounds having various steroid substituents which are described for the formula (21) can also be included.

Diamino compounds represented by the formula (25) can include, for example, 1-cyclohexyl-4-[4-(4-aminobenzyl)-2-aminophenyl]cyclohexane, 1-(4-methylcyclohexyl)-4-[4-(4-aminobenzyl)-2-aminophenyl]cyclohexane, 1-(4-propylcyclohexyl)-4-[4-(4-aminobenzyl)-2-aminophenyl]cyclohexane, 1-(4-pentylcyclohexyl)-4-[4-(4-aminobenzyl)-2-aminophenyl]cyclohexane, 1-(4-octylcyclohexyl)-4-[4-(4-aminobenzyl)-2-aminophenyl]cyclohexane, 1-(4-decylcyclohexyl)-4-[4-(4-aminobenzyl)-2-aminophenyl]cyclohexane, 1-(4-dodecylcyclohexyl)-4-[4-(4-aminobenzyl)-2-aminophenyl]cyclohexane, 1-cyclohexyl-4-[4-(3-aminobenzyl)-2-aminophenyl]cyclohexane, 1-(4-methylcyclohexyl)-4-[4-(3-aminobenzyl)-2-aminophenyl]cyclohexane, 1-(4-propylcyclohexyl)-4-[4-(3-aminobenzyl)-2-aminophenyl]cyclohexane, 1-(4-pentylcyclohexyl)-4-[4-(3-aminobenzyl)-2-aminophenyl]cyclohexane, 1-(4-octylcyclohexyl)-4-[4-(3-aminobenzyl)-2-aminophenyl]cyclohexane, 1-(4-decylcyclohexyl)-4-[4-(3-aminobenzyl)-2-aminophenyl]cyclohexane and 1-(4-dodecylcyclohexyl)-4-[4-(3-aminobenzyl)-2-aminophenyl]cyclohexane.

The above-recited compounds are only examples of diamino compounds represented by the formulas (22-1 to 22-4), (23), (24) or (25), to which diamino compounds having a side chain of 3 or more carbon atoms used in the present invention are not limited.

When the side chain of these diamino compounds is short or the amount of the diamino compound used is little, the pretilt angle becomes small, but small pretilt angle is suitable for IPS element. The pretilt angle of about 3 to 8° is suitable for TN type TFT element. Larger pretilt angle may be required in STN element and a ferroelectric liquid crystal display element. Further, still larger pretilt angle is required in OCB element and vertical alignment element. In such a case, it is desirable to use a component having a long side chain or a large quantity of a polyamic acid A component.

Diamino compounds having a side chain of 3 or more carbon atoms (sometimes called "first diamino compound" hereafter) and diamino compounds having no side chain of 3 or more carbon atoms (sometimes called "second diamino compound" hereafter) may be used in combination. The first diamino compounds are those referred to in the explanation about the formulas (22-1) to (22-4), (23), (24) or (25). As the second diamino compound, at least one compound selected from diamino compounds having only aromatic group such as the compounds of the formula (20), aromatic, alicyclic and aliphatic diamino compounds as recited below, or diamino compounds containing at least two of aromatic, alicyclic and aliphatic groups is preferably used in combination in view of electrical and display properties of liquid crystal display element.

The aromatic diamino compounds include, for example, 2,2-bis(4-aminophenyl)propane, 2,6-diaminopyridine, bis(4-aminophenyl)diethylsilane, bis(4-aminophenyl)diphenylsilane, bis(4-aminophenyl)ethylphosphine oxide, bis(4-aminophenyl)-N-butylamine, N,N-bis-(4-aminophenyl)-N-methylamine, N-(3-aminophenyl)-4-aminobenzamide, 3,3'-diaminodiphenylmethane, 3,3'-diaminodiphenylether, 3,3'-diaminodiphenylsulfone, 2,2-bis(3-aminophenyl)propane, 1,3-bis(3-aminophenyl)propane, 3,3'-diaminodiphenylsulfide, 2,3,5,6-tetramethyl-p-phenylenediamine, 2,5-dimethyl-p-phenylenediamine, p-phenylenediamine, m-phenylenediamine, p-xylenediamine, m-xylenediamine, p-xylylenediamine, m-xylylenediamine, 2,4-diaminotoluene, 2,6-diaminotoluene, 1,2-bis(3-diaminophenyl)ethane, 1,1-bis(3-diaminophenyl)ethane, 4,4'-diaminodiphenylhexafluoropropane, 2,2-bis(4-aminophenyl)hexafluoropropane, 4,4'-diaminobenzophenone, 4,4'-diaminodiphenylsulfide, 4,4'-diaminodiphenylsulfone, 4,4'-diaminodiphenylether, 3,4'-diaminodiphenylether, 1,5-diaminonaphthalene, 2,6-diaminonaphthalene, bis[4-(4-aminophenoxy)phenyl]methane, 1,1-bis[4-(4-aminophenoxy)phenyl]ethane, 1,2-bis[4-(4-aminophenoxy)phenyl]ethane, 1,1-bis[4-(4-aminophenoxy)phenyl]propane, 2,2-bis[4-(4-aminophenoxy)phenyl]propane, 2,2-bis[4-(4-aminophenoxy)phenyl]butane, 4,4'-bis(4-aminophenoxy)diphenylketone, bis[4-(4-aminophenoxy)phenyl]sulfone, bis[4-(4-aminophenoxy)phenyl]sulfide, 1,3-bis[4-(4-aminophenoxy)phenyl]benzene, 1,4-bis[4-(4-aminophenoxy)phenyl]benzene, 4,4'-bis[4-(4-aminophenoxy)phenyl]biphenyl, 1,2-bis[4-(4-aminophenoxy)phenyl]cyclohexane, 1,3-bis[4-(4-aminophenoxy)phenyl]cyclohexane, 1,4-bis[4-(4-aminophenoxy)phenyl]cyclohexane, bis[4-(4-aminophenoxy)phenyl]hexafluoropropane, 2,2-bis[4-(2-aminophenoxy)phenyl]hexafluoropropane, 2,2-bis[4-(3-aminophenoxy)phenyl]hexafluoropropane, 2,2-bis[4-(3-carbamoyl-4-aminophenoxy)phenyl]hexafluoropropane, 2,2-bis(3-sulfamoyl-4-aminophenyl)hexafluoropropane, 2,2-bis(3-carboxy-4-aminophenyl)hexafluoropropane, 2,2-bis[4-(3-sulfamoyl-4-aminophenoxy)phenyl]hexafluoropropane, 2,2-bis[4-(3-carboxy-4-aminophenoxy)phenyl]hexafluoropropane, 1,3-bis[2,2-{4-(4-aminophenoxy)phenyl}hexafluoroisopropyl]benzene, 2,4-bis(β-amino-t-butyl)toluene, bis(p-β-methyl-γ-aminopentyl)benzene, bis-p-(1,1-dimethyl-5-aminopentyl)benzene, bis(p-β-amino-t-butylphenyl)ether, bis(4-aminobenzyloxy)methane, bis(4-aminobenzyloxy)ethane, bis(4-aminobenzyloxy)propane and bis(4-aminobenzyloxy)cyclohexane.

The alicyclic diamino compounds include, for example, 1,4-diaminodicyclohexane, 1,3-bis(aminomethyl)cyclohexane, 1,4-bis(aminomethyl)cyclohexane, 4,4'-diaminodicyclohexylmethane, bis(2-methyl-4-aminocyclohexyl)methane, isophoronediamine, 2,5-bis(aminomethyl)bicyclo[2.2.1]heptane, 2,6-bis(aminomethyl)-bicyclo[2.2.1]heptane, 2,3-diaminobicyclo[2.2.1]heptane, 2,5-diaminobicyclo[2.2.1]heptane, 2,6-diaminobicyclo[2.2.1]heptane, 2,7-diaminobicyclo[2.2.1]heptane, 2,3-diamino-7-azabicyclo[2.2.1]heptane, 2,5-diamino-7-azabicyclo[2.2.1]heptane, 2,6-diamino-7-azabicyclo[2.2.1]heptane, 2,3-diamino-7-thiabicyclo[2.2.1]heptane, 2,5-diamino-7-thiabicyclo[2.2.1]heptane, 2,6-diamino-7-thiabicyclo[2.2.1]heptane, 2,3-diaminobicyclo[2.2.2]octane, 2,5-diaminobicyclo[2.2.2]octane, 2,6-diaminobicyclo[2.2.2]octane, 2,5-diaminobicyclo[2.2.2]oct- 7-ene, 2,5-diamino-7-azabicyclo[2.2.2]octane, 2,5-diamino-7-oxabicyclo[2.2.2]octane, 2,5-diamino-7-thiabicyclo[2.2.2]octane, 2,6-diaminobicyclo[3.2.1]octane, 2,6-diaminoazabicyclo[3.2.1]octane, 2,6-diaminooxabicyclo[3.2.1]octane, 2,6-diaminothiabicyclo[3.2.1]octane, 2,6-diaminobicyclo[3.2.2]nonane, 2,6-diaminobicyclo[3.2.2]nona-8-ene, 2,6-diamino-8-azabicyclo[3.2.2]nonane, 2,6-diamino-8-oxabicyclo[3.2.2]nonane and 2,6-diamino-8-thiabicyclo[3.2.2]nonane.

The aliphatic diamino compounds include, for example, ethylenediamine, trimethylenediamine, tetramethylenediamine, pentamethylenediamine, hexamethylenediamine, and alkylene diamine which has an oxygen atom in the alkylene group.

Of these second diamino compounds, a combined use of aliphatic diamines in a large quantity may have an adverse effect on the alignment of liquid crystal molecule. Therefore, the amount of aliphatic diamines used should be within the range that can avoid such adverse effect.

Preferably, these second diamino compounds have the structure which does not contain in the skeleton an oxygen-containing group such as ester and ether groups or a sulfur-containing group in order to avoid a reduction in electrical properties of liquid crystal display element.

In the diamines used in the production of polyamic acid A, the proportion of the first diamino compound and the second diamino compound is decided by the kind of the first diamine and the required pretilt angle, and it cannot be specified generally, with the molar ratio of the first diamino compound/the second compound being from 100/0 to 1/99, preferably 100/0 to 10/90, more preferably 100/0 to 20/80.

Preferably, soluble polyimides represented by the formula (3) are those wherein $R^5$ representing a tetracarboxylic acid radical, $R^6$ representing a diamine radical, or both of these are radicals having a side chain of 3 or more carbon atoms.

As such tetracarboxylic acids are used aliphatic, aromatic or alicyclic tetracarboxylic acids generally used for soluble polyimides. The aliphatic compounds include, for example, ethane tetracarboxylic dianhydrides, butane tetracarboxylic dianhydrides, and butane tetracarboxylic dianhydrides wherein hydrogen at the 2,3-potision is substituted with the other organic group (methyl, ethyl, phenyl, benzyl, etc.) The alicyclic compounds include, for example, tricarboxycyclopentylacetic dianhydride, 1,4-hexylylenedicarboxylic acid, 3,3,4-dicarboxy-1,2,3,4-tetrahydronaphthalenesuccinic dianhydride, 5-(2,5-dioxotetrahydro-3-furanyl)-3-cyclohexene-1,2-dicarboxylic anhydride, 3,5,6-tricarboxynorbornane-2-acetic dianhydride, tetracarboxylic furanyl dianhydride, bicyclo[2.2.2]oct-7-enetetracarboxylic dianhydride, tetracyclo[6.2.1.0$^{2,7}$]dodeca-4,5,9,10-tetracarboxylic dianhydride and bicycloheptanetetracarboxylic dianhydride. The aromatic compounds include, for example, 2,3,3',4'-benzophenonetetracarboxylic dianhydride, 3,3',4,4'-benzophenonetetracarboxylic dianhydride, 2,3,3',4'-biphenyltetracarboxylic dianhydride, 3,3',4,4'-biphenyltetracarboxylic dianhydride, 3,3',4,4'-diphenylethertetracarboxylic dianhydride, 3,3',4,4'-dicarboxydiphenylmethanetetracarboxylic dianhydride, 3,3', 4,4'-dicarboxydiphenylethanetetracarboxylic dianhydride, 3,3',4,4'-dicarboxydiphenylpropanetetracarboxylic dianhydride, 4,4'-bis(3,4-dicarboxyphenoxy) diphenylmethane dianhydride, 4,4'-bis(3,4-dicarboxyphenoxy)diphenylethane dianhydride, 4,4'-bis(3,4-dicarboxyphenoxy)diphenylpropane dianhydride, 4,4'-bis(3,4-dicarboxyphenylmethyl)diphenylmethane dianhydride, 4,4'-bis(3,4-dicarboxyphenylmethyl)diphenylethane dianhydride, 4,4'-bis(3,4-dicarboxyphenylmethyl) diphenylpropane dianhydride, 3,3',4,4'-dimethyldiphenylsilanetetracarboxylic dianhydride, 3,4'-bis(3,4-dicarboxy)diphenylsulfide dianhydride and 2,2-bis(3,4-dicarboxyphenyl)hexafluoropropane dianhydride. Siloxane tetracarboxylic dianhydrides can also be included, and they can be used together with other aliphatic or aromatic tetracarboxylic acids as far as polyimides are soluble.

Preferably, tetracarboxylic acids used in the production of soluble polyimides are alicyclic or aliphatic systems. However, the aliphatic system may have an adverse effect on the alignment of liquid crystal. Therefore, it is preferably used together with the alicyclic or aromatic system. When using the aromatic system, it is preferable to use the aromatic system singly as mentioned above for the polyamic acid A, or in combination such as a combination of the aromatic system with the aliphatic system or a combination of the aromatic system with the alicyclic system. Further, three components of aromatic, alicyclic and aliphatic systems may be used in combination, so far as they are soluble.

For diamines used in the production of soluble polyimides, the same description as mentioned for diamines used in the production of polyamic acid A can be applied. Likewise, it is preferable to use a diamine having a side chain of 3 or more carbon atoms. The proportion of the diamine used can account for 1 to 100 mol % of the whole diamine component.

Soluble polyimides represented by the formula (3) can be prepared by reacting such tetracarboxylic acids with such diamines in accordance with a conventional method.

The degree of imidization for the polyimide of the present invention may be suitably 50% or more, preferably 70% or more, and more preferably 90% or more.

The polymer component of the present invention contains as an essential component polyamic acid B represented by the formula (1), polyamic acid A represented by the formula (2) and soluble polyimide represented by the formula (3). The weight ratio of polyamic acid A to soluble polyimide is from 1/99 to 99/1, preferably 10/90 to 90/10, and the sum of these accounts for 1 to 80% by weight, preferably 2 to 50% by weight, more preferably 4 to 30% by weight of the whole polymer component. Accordingly, the proportion of polyamic acid B in the whole polymer component is calculated as 99 to 20% by weight, preferably 98 to 50% by weight and more preferably 96 to 70% by weight.

With regard to the proportion of the polyamic acid A and the soluble polyimide, if the polyamic acid A accounts for not more than 1% by weight of the sum of both, a pretilt angle may be difficult to become large. With the polyamic acid A of 99% by weight or more, the effect of preventing an image sticking may be lower. If the proportion of the soluble polyimide in the polymer component increases, a coating property will tend to become poor. Thus, the proportion thereof is preferably not more than 25% by weight. From the viewpoint of preventing an image sticking, this proportion is preferably not less than 1% by weight. Unless preventing the effect of the invention, the composition may contain other polymers such as polyamides or polyamide-imides wherein H in an amido group (CONH) may be replaced by other monovalent organic group.

The varnish composition of the present invention contains as an essential component such a polymer component and the solvent for dissolving this ingredient, and a preferred proportion of the polymer component in a varnish composition is 0.1 to 40% by weight.

In coating a substrate with a varnish composition, an operation of reducing the concentration of polymer component in the composition by preliminary dilution with a solvent may be required for the adjustment of coating thickness. If the concentration of polymer component exceeds 40% by weight, the viscosity of composition is too high, thus causing adverse effects that in a solvent the polymer component cannot be mixed with the composition well or diluted as desired. Therefore, it is not preferable. For keeping a coating thickness good in the case of spinner and print methods, not more than 10% by weight of the polymer component is usually used in many cases. For other coating methods, e.g., a dipping method, the concentration lower than 10% by weight may be employed.

On the other hand, the polymer component concentration of less than 0.1% by weight tends to cause the problem that the thickness of the resultant liquid crystal aligning film is too thin.

Thus the concentration of polymer component is suitably not less than 0.1% by weight, preferably 0.5 to 10% by weight, for conventional spinner and print methods. However, it may be used at a thinner concentration, depending on the method of coating a varnish.

The solvent used with the above-mentioned polymer component in the varnish composition of the invention is applicable without limitation, if it is capable of dissolving a polymer component.

As such solvents are suitable those conventionally used in the manufacturing process and application of a polyamic acid or a soluble polyimide. They may be selected suitably according to the purpose of use.

Examples of these solvents can include aprotic polar organic solvents which are a good solvent to a polyamic acid and a polyimide, such as N-methyl-2-pyrrolidone, dimethylimidazolidinone, N-methylcaprolactam, N-methylpropioneamide, N,N-dimethylacetamide, dimethylsulfoxide, N,N-dimethylformamide, N,N-diethylformamide, diethylacetamide and y-butyrolactone; and moreover, other solvents used for improving the coating property, such as alkyl lactate, 3-methyl-3-methoxy butanol, tetralin, isophorone, ethylene glycol monoalkyl ethers such as ethylene glycol monobutyl ether, diethylene glycol monoalkyl ether such as diethylene glycol monoethyl ether, ethylene glycol monoalkyl ether acetate or ethylene glycol monophenyl ether acetate, triethylene glycol monoalkyl ether, propylene glycol monoalkyl ether such as propylene glycol monobutyl ether, dialkyl malonate such as diethyl malonate, dipropylene glycol monoalkyl ether such as dipropylene glycol monomethyl ether, or ester compounds such as these acetates.

The varnish composition of the invention thus prepared is suitable mainly for the formation of the liquid crystal aligning film for TFT, and it can provide acceptable pretilt as required. Therefore, it is also useful in the formation of the liquid crystal aligning film for conventional 90° TN elements, STN elements, OCB (Optically Compensated Birefringence) elements, ferroelectric liquid crystal, or antiferroelectric liquid crystal display elements. Further, the present varnish composition can be used for a protective coat, an insulating coat, etc., because of its excellent electrical properties.

The formation of liquid crystal aligning film is performed by the step of coating the varnish composition on a substrate and the subsequent steps of drying and heat-treating required for dehydration and ring closure reactions.

As a coating method, spinner, print, dipping and dropping methods, etc. are generally known. These methods are likewise applicable to the present invention. As a method of carrying out the drying and heat-treating steps required for dehydration and ring closure reactions, a method of heat-treating in an oven or an infrared oven, a method of heat-treating on a hot plate, etc. are generally known. These methods are likewise applicable to the present invention.

It is preferred that the drying step is performed under relatively low temperatures as far as a solvent can vaporize. It is generally preferred that the heat-treating step is performed at a temperature of 150 to 300° C.

The varnish composition of the invention can contain various kinds of additives if necessary. For example, when the promotion of imidization is desired, a catalyst meeting the purpose may be incorporated. When the improvement in antistatic effect is needed, an antistatic agent may be incorporated. When the improvement in adhesion to a substrate is desired, coupling agents such as silane, titanium and epoxy coupling agents may be incorporated. Although the varnish composition of the present invention has the improved coating property, a surface active agent may be added for improving the coating property.

The liquid crystal composition used for the liquid crystal display element of the invention is prepared by mixing compounds selected from the group consisting of the compounds represented by the formulas (9) to (19) according to the purpose of a liquid crystal composition. Known compounds can further be mixed in order to adjust a threshold voltage, a liquid crystal phase temperature range, an optical anisotropy, a dielectric anisotropy, viscosity, etc. Moreover, the atom constituting these compounds may be replaced by the isotope.

The following compounds can be recited as preferable examples of the compounds represented by the formula (9), (10) or (11) which are used in the liquid crystal composition for constituting the liquid crystal display element of the invention.

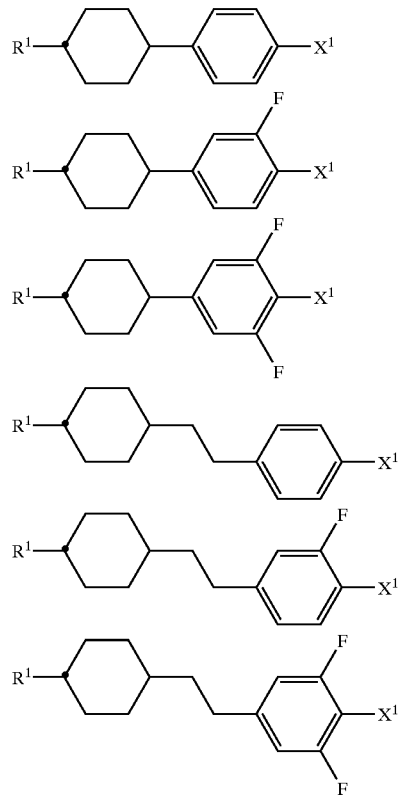

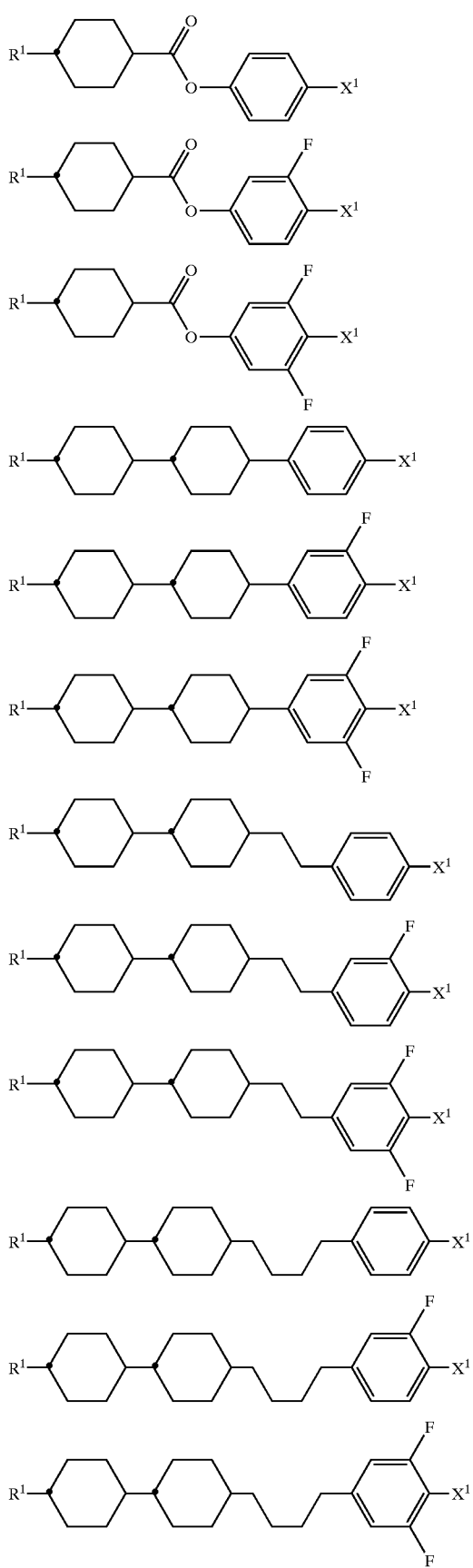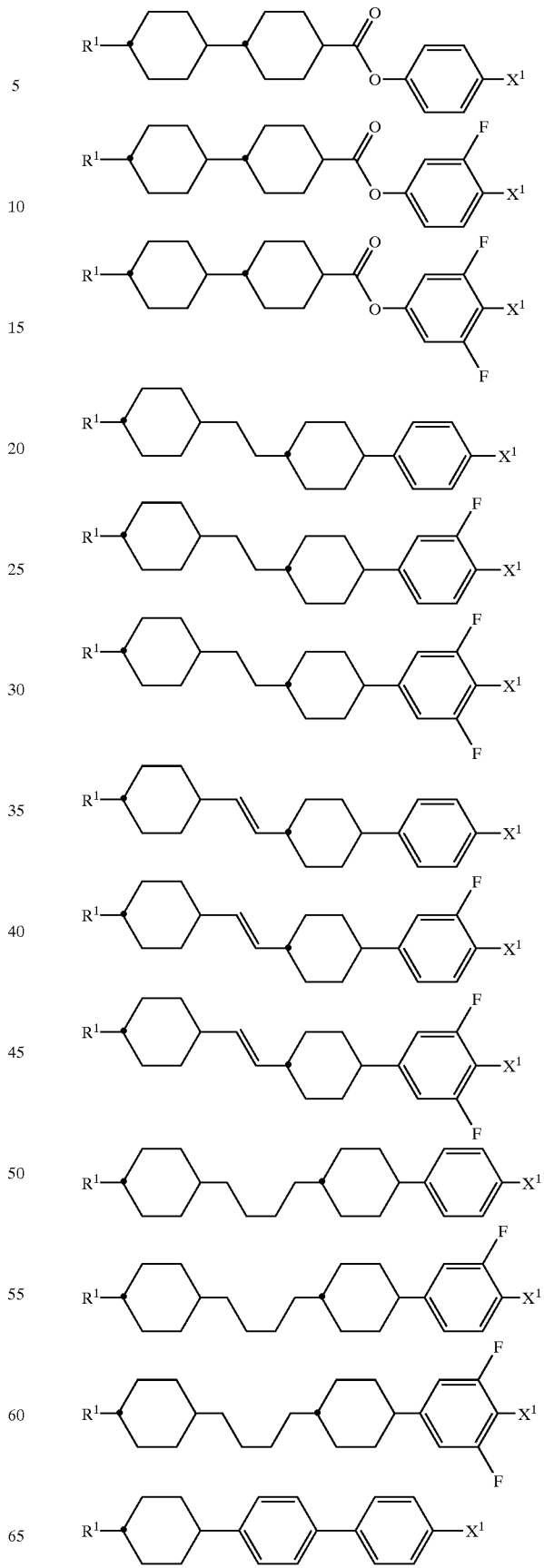

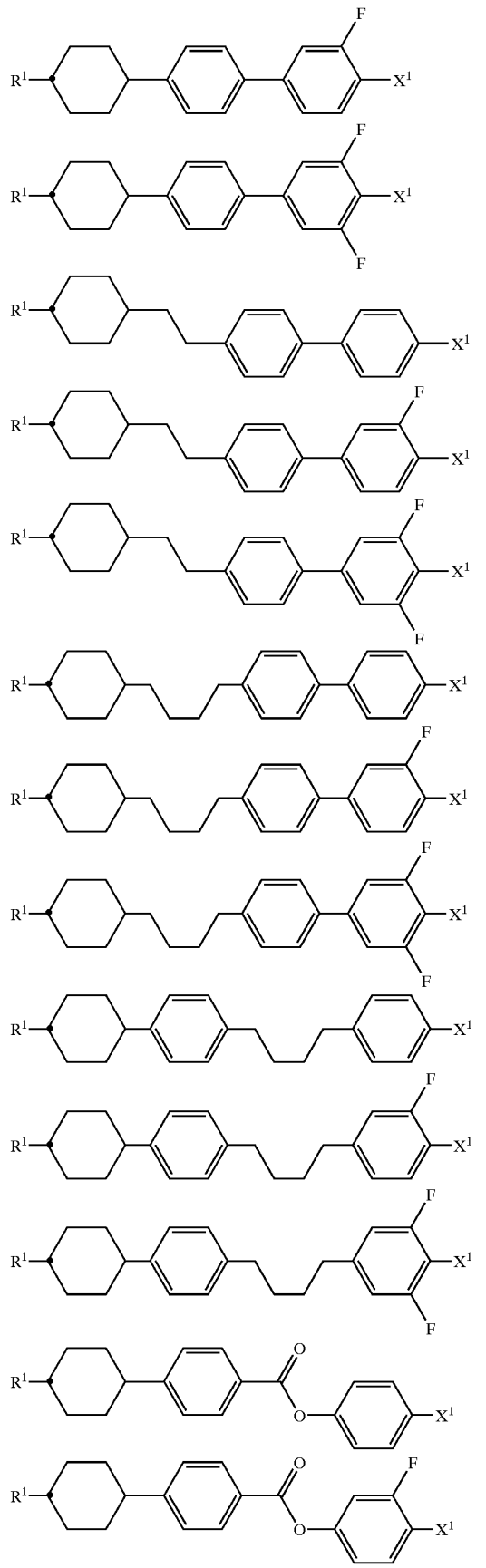
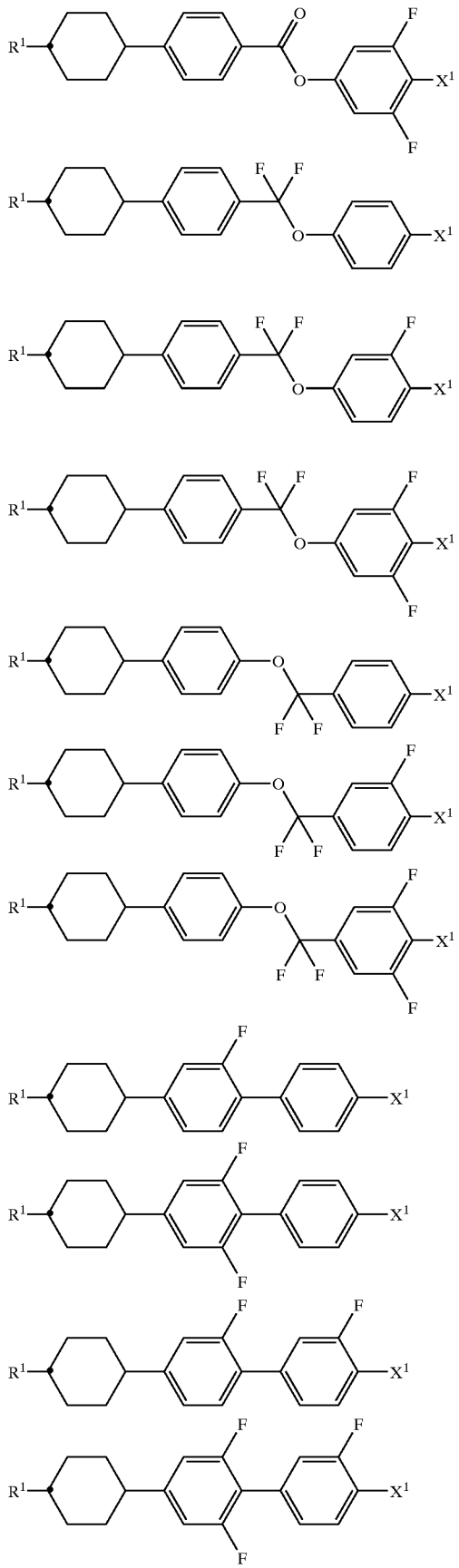

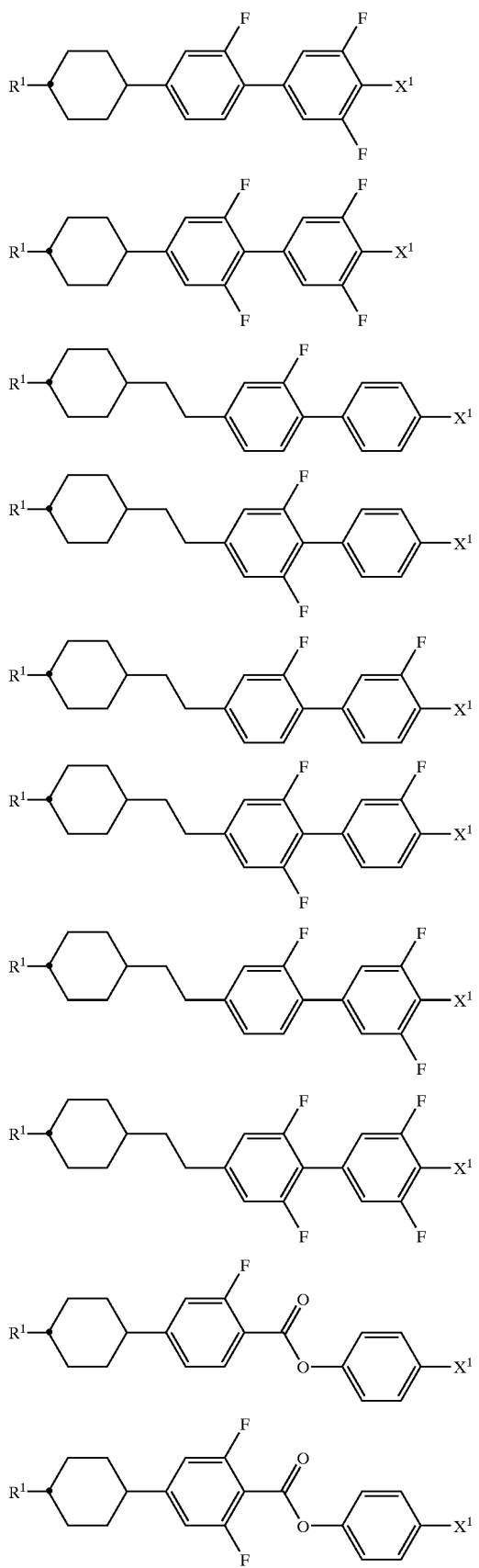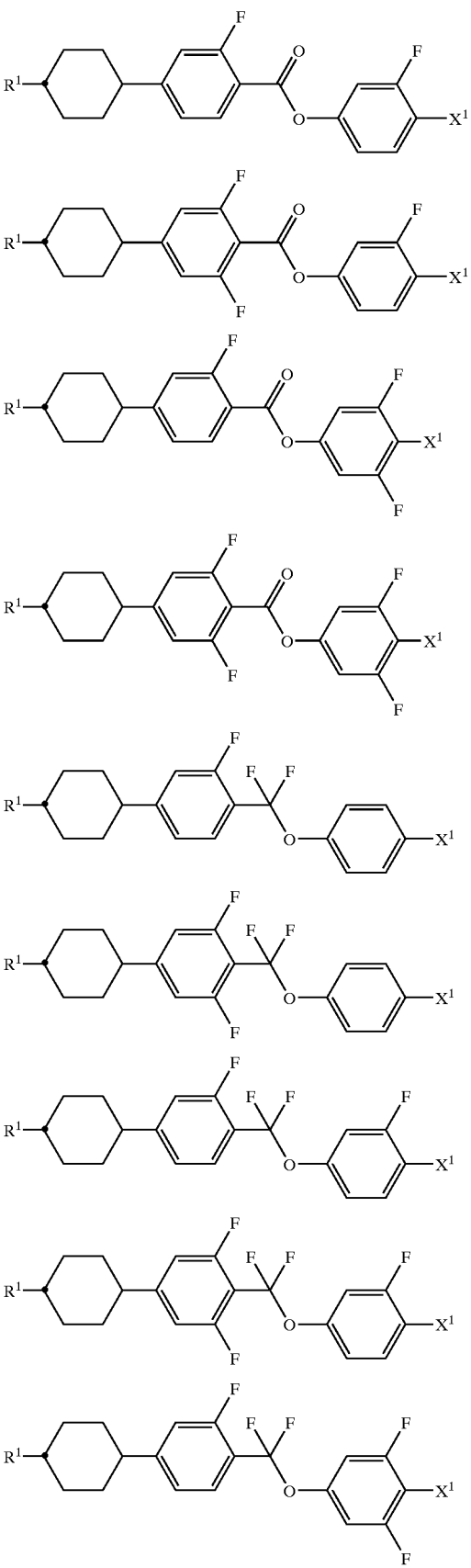

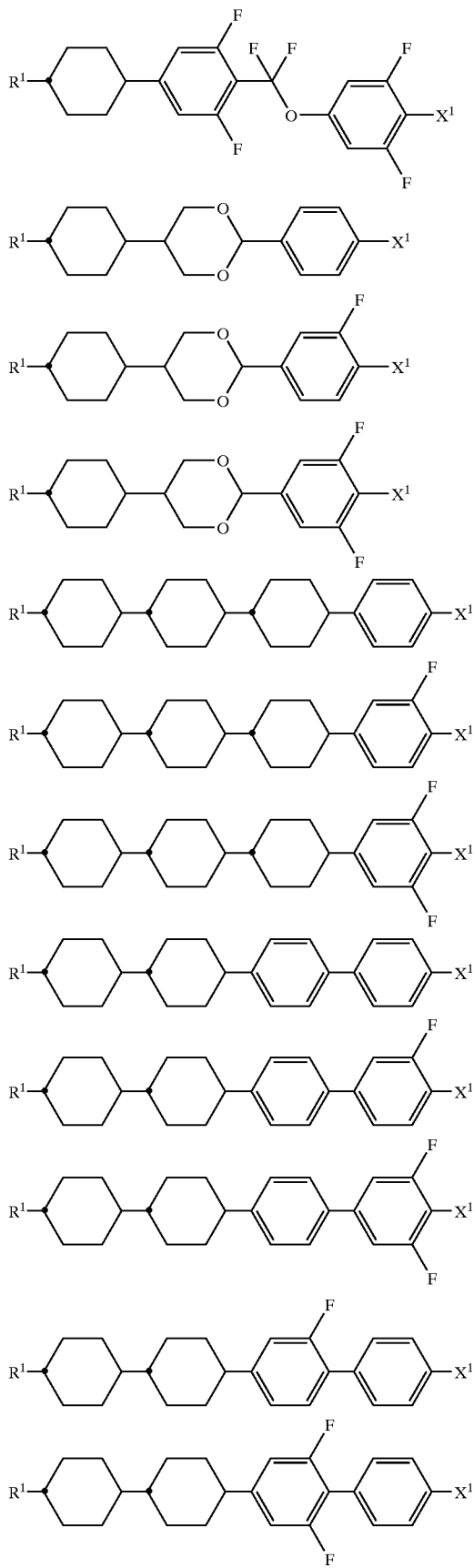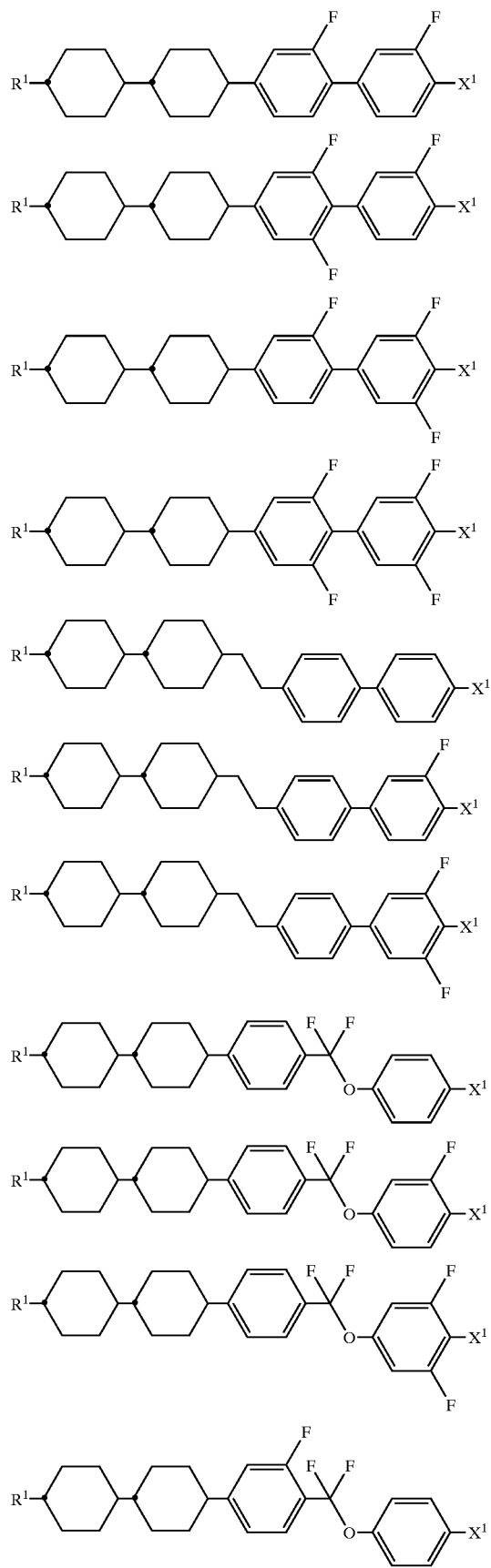

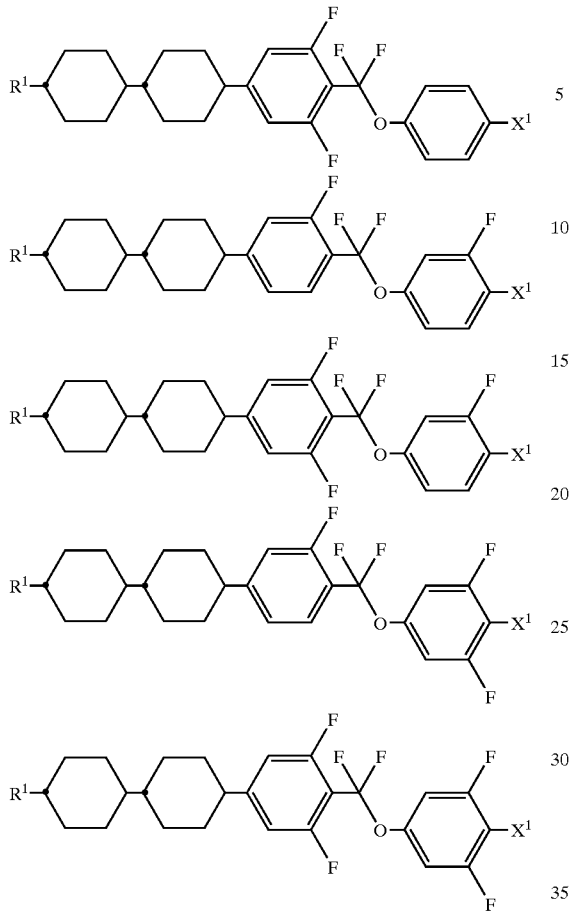

In the above formulas, $R^1$ and $X^1$ denote the same meanings as mentioned above for the formulas (9) to (11).

The compounds represented by the formula (9), (10) or (11) have a positive dielectric anisotropy and very excellent thermal and chemical stability, and they are very useful especially in the preparation of a liquid crystal composition for TFT in which a high reliability is required such as high voltage holding ratio and high specific resistance.

In the preparation of the liquid crystal composition for TFT, the amount of the compound of the formula (9), (10) or (11) used ranges from 0.1 to 99.9% by weight, preferably 10 to 97% by weight, more preferably 40 to 95% by weight, based on the total weight of the liquid crystal composition. The compound represented by the formula (17), (18) or (19) may further be contained for the viscosity adjustment of the composition.

The compound represented by the formula (9), (10) or (11) can be used also in the preparation of the liquid crystal composition for STN or TN, but it is preferable to use them in the level of not more than 50% by weight.

The following compounds can be recited as preferable examples of the compounds represented by the formula (12) or (13) which are used in the liquid crystal composition for constituting the liquid crystal display element of the invention.

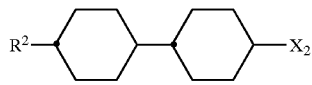

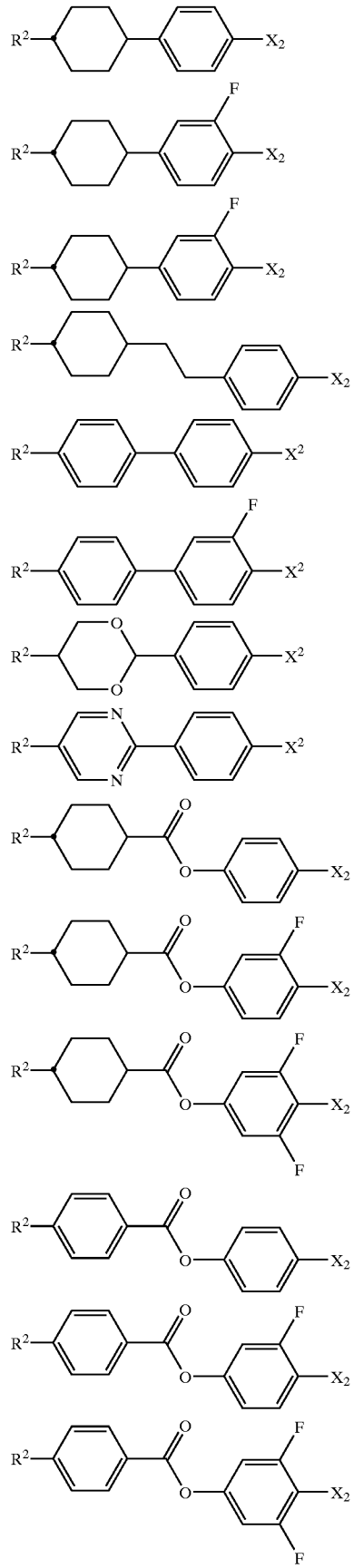

-continued
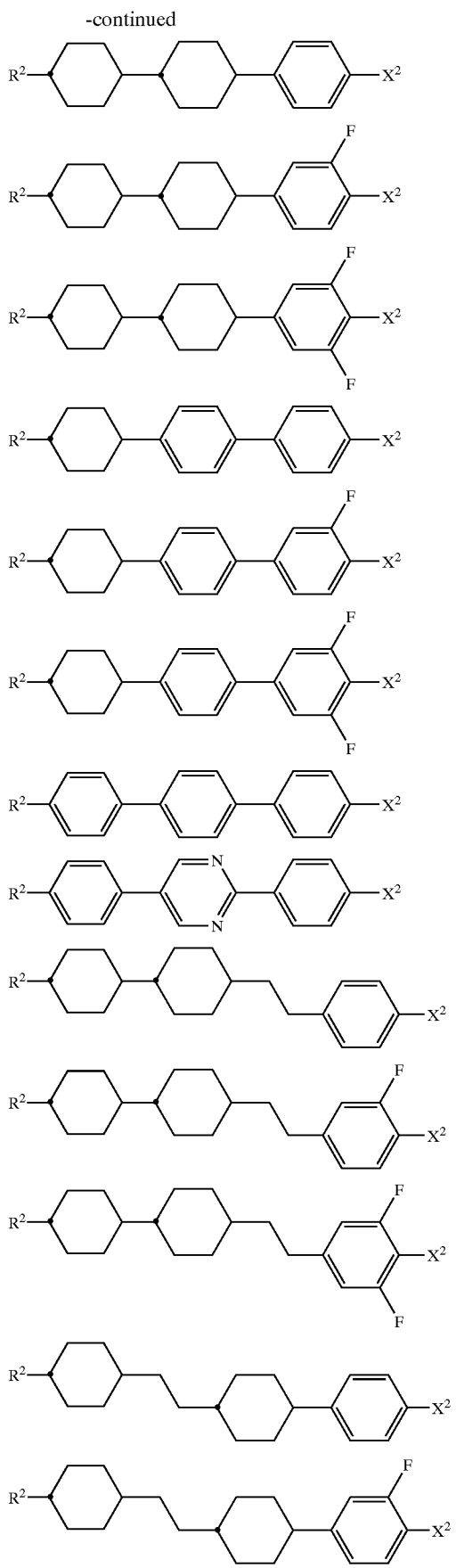
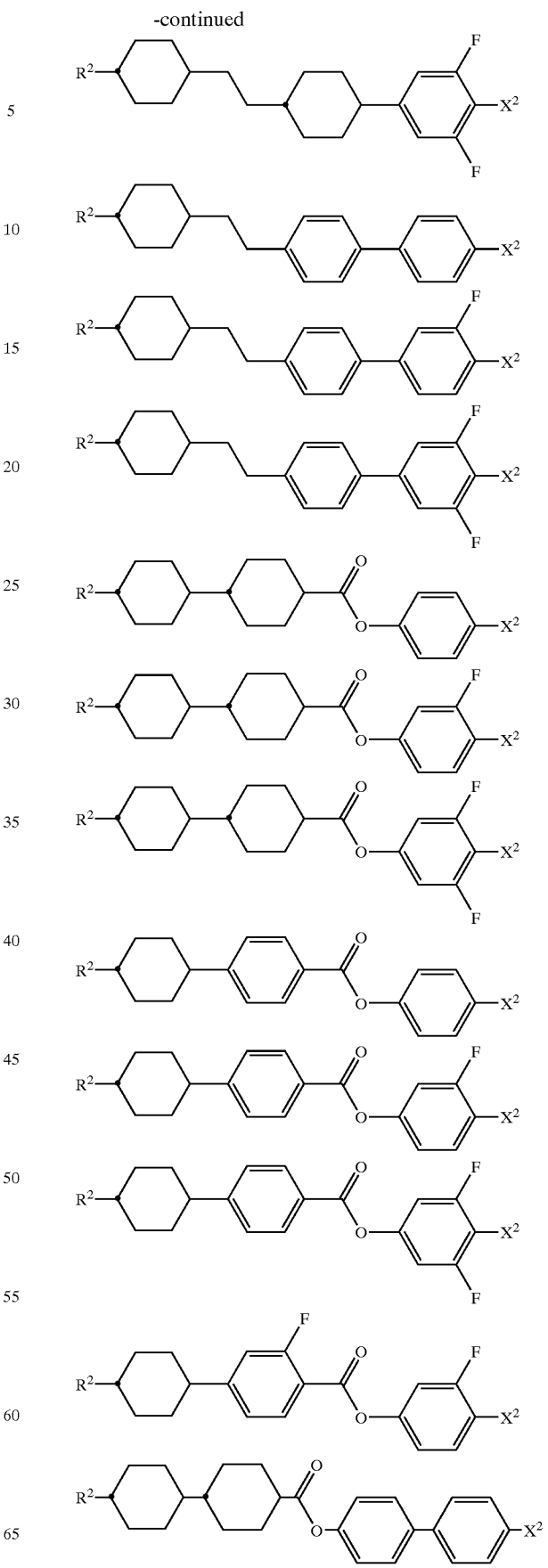

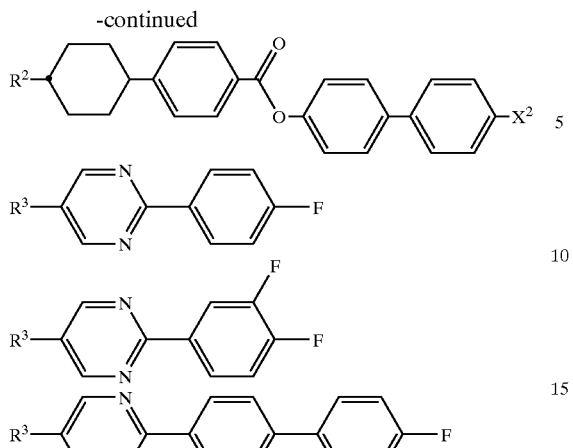

In the above formulas, $R^2$, $R^3$ and $X^2$ denote the same meanings as mentioned above for the formulas (12) and (13).

The compounds represented by the formula (12) or (13) have highly positive dielectric anisotropy, and so they are especially suitable for the use to reduce a threshold voltage of the liquid crystal composition. Further, they are used for adjusting an optical anisotropy, broadening a nematic range such as an increase in clearing point, etc. Furthermore, they are used for improving the steepness in voltage-transmittance characteristics of the liquid crystal composition for STN or TN.

The compounds represented by the formula (12) or (13) are especially useful for the preparation of the liquid crystal composition for STN or TN.

When the amount of the compound of the formula (12) or (13) increases in the liquid crystal composition, the threshold voltage of liquid crystal composition reduces, but the viscosity increases. Accordingly, it is advantageous for low voltage drive to use these compounds in large quantities, so long as the viscosity of liquid crystal composition satisfies the required value. In the preparation of the liquid crystal composition for STN or TN, the amount of the compound of the formula (12) or (13) used ranges from 0.1 to 99.9% by weight, preferably 10 to 97% by weight, more preferably 40 to 95% by weight, based on the total weight of the liquid crystal composition.

The following compounds can be recited as preferable examples of the compounds represented by the formula (14), (15) or (16) which are used in the liquid crystal composition for constituting the liquid crystal display element of the invention.

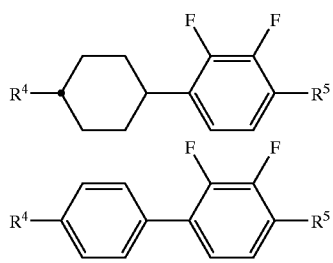

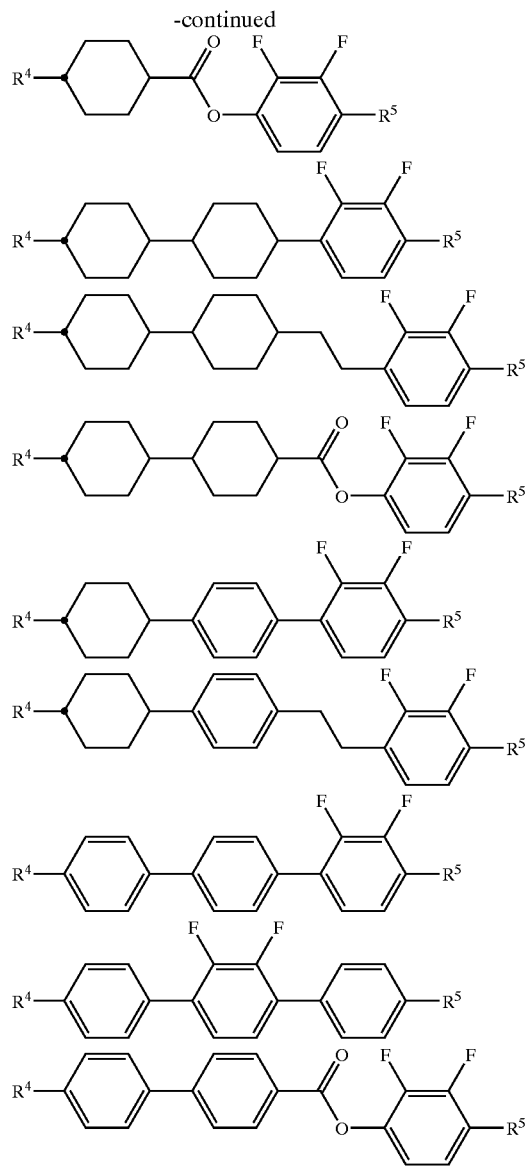

In the above formulas, $R^4$ and $R^5$ denote the same meanings as mentioned above for the formulas (14) to (16).

The compounds represented by the formula (14), (15) or (16) are those wherein the dielectric anisotropy is negative. The compound represented by the formula (14) is a bicyclic compound, and therefore used mainly for the purpose of adjusting a threshold voltage, viscosity and optical anisotropy. The compound represented by the formula (15) is used for the purpose of extending a nematic phase range such as increasing a clearing point, or for the purpose of adjusting an optical anisotropy. The compound represented by the formula (16) is used for the purpose of reducing a threshold voltage and increasing an optical anisotropy, in addition to the purpose of extending a nematic phase range.

The compounds represented by the formula (14), (15) or (16) are used mainly in the liquid crystal composition wherein the dielectric anisotropy is negative. If the amount used is increased, the threshold voltage of the composition reduces and the viscosity increases. Thus it is preferable to use the compound in small amount, as far as the value required for the threshold voltage is satisfied. However, less than 40% by weight of the compound may make low voltage driving impossible, since the absolute value of the dielectric anisotropy is not more than 5. The amount of the compound of formula (14), (15) or (16) used is preferably not less than 40% by weight, and suitably 50 to 95% by weight. Optionally, the compounds represented by the formula (14), (15) or (16) may be added in the composition wherein the dielectric anisotropy is positive for the purpose of controlling the elastic constant and the voltage-transmittance curve of the composition. In this case, the amount of the compound of the formula (14), (15) or (16) used is preferably not more than 30% by weight.

The following compounds can be recited as preferable examples of the compounds represented by the formula (17), (18) or (19) which are used in the liquid crystal composition for the liquid crystal display element of the invention.

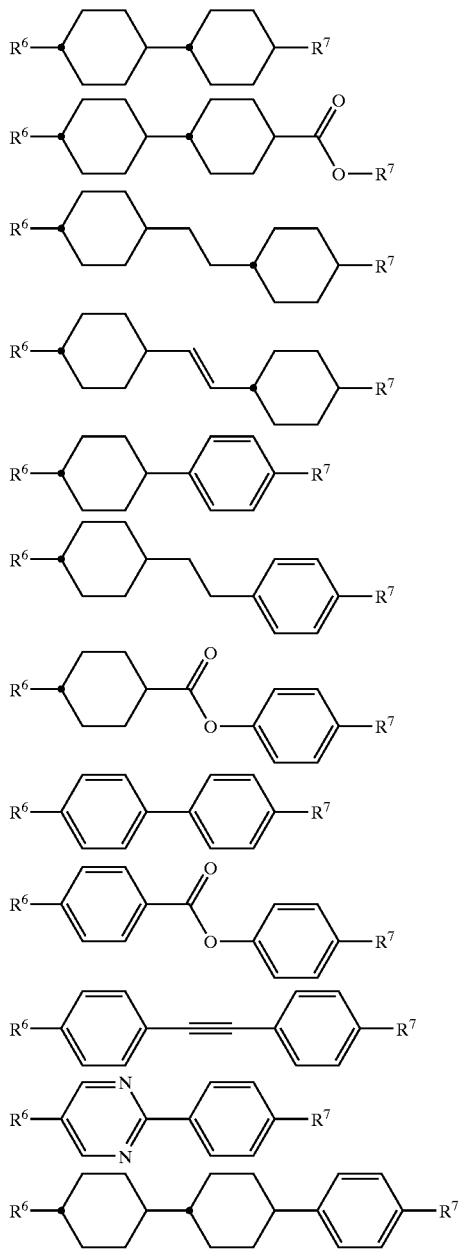

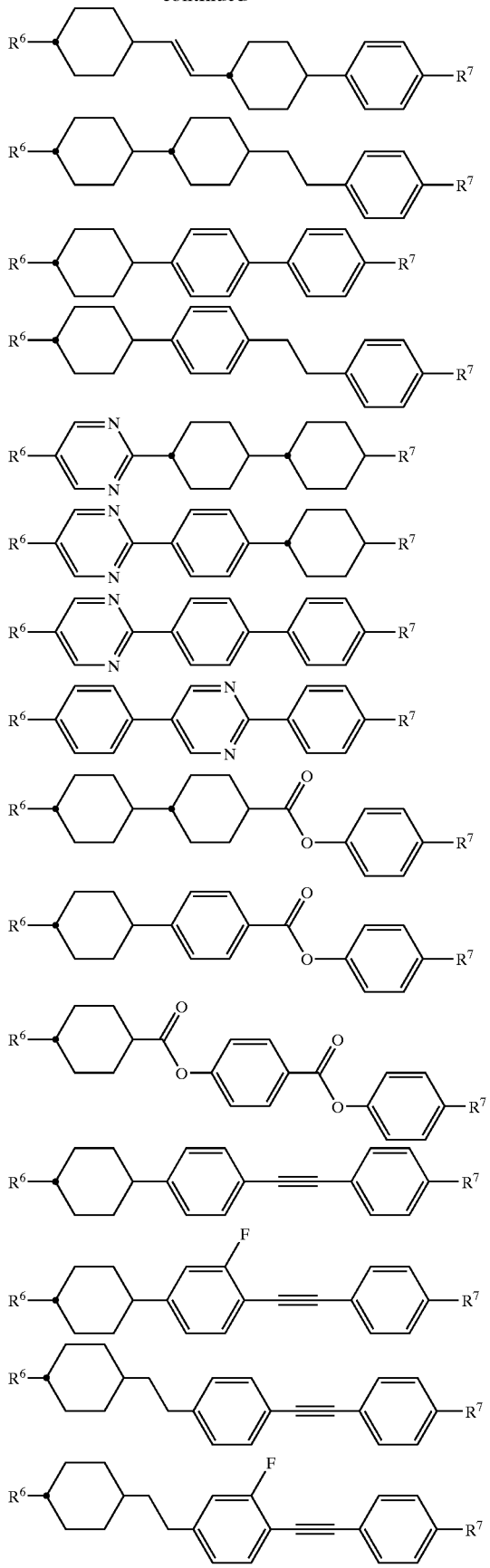

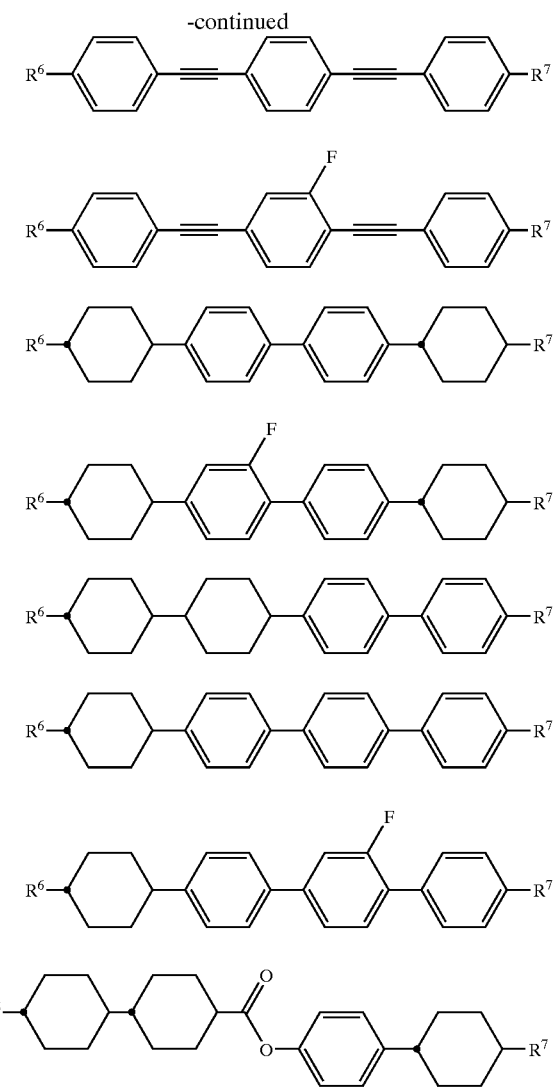

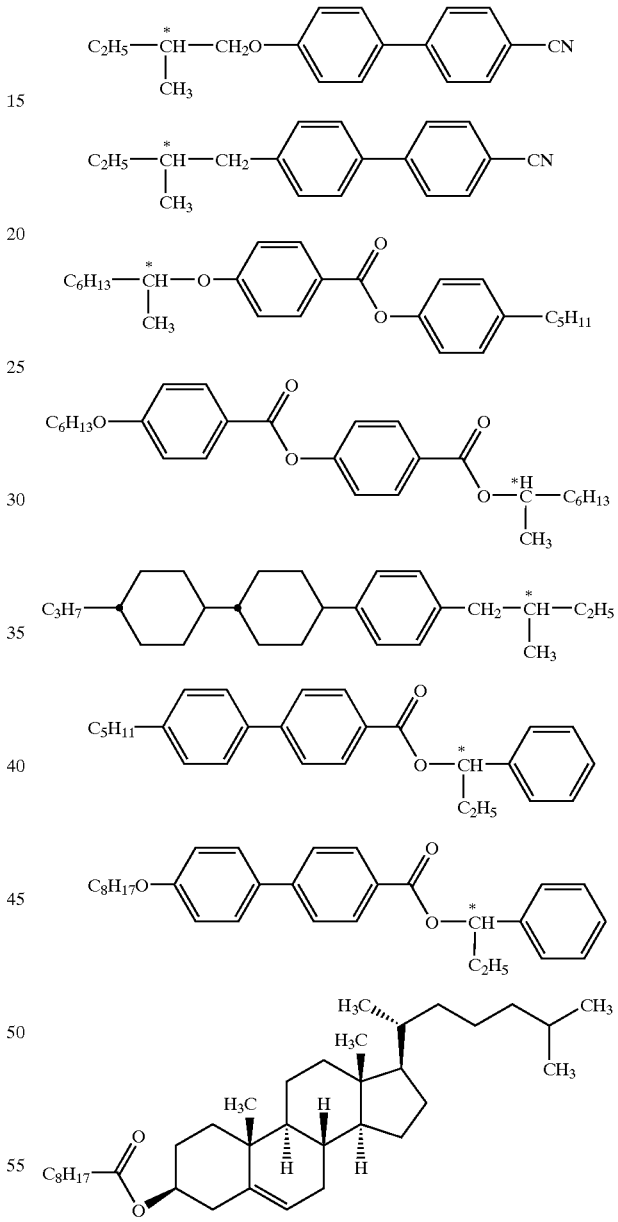

In the above formulas, $R^6$ and $R^7$ denote the same meanings as mentioned above for the formulas (17) to (19).

The compounds represented by the formula (17), (18) or (19) have a small absolute value of the dielectric anisotropy and are close to neutrality. The compound represented by the formula (17) is used mainly for the purpose of adjusting the viscosity or optical anisotropy. The compounds represented by the formulas (18) and (19) are used for the purpose of extending a nematic phase range such as increasing a clearing point, etc., or adjusting the optical anisotropy.

When the amount of the compound of the formula (17), (18) or (19) used is increased, the threshold voltage of the liquid crystal composition increases and the viscosity reduces. Accordingly, it is desirable to use the compounds in large quantities, as long as the required value of the threshold voltage of the liquid crystal composition is satisfied. In the preparation of the liquid crystal composition for TFT, the amount of the compound of the formula (17), (18) or (19) used is preferably not more than 40% by weight, and more preferably not more than 35% by weight, based on the total weight of the liquid crystal composition. In the preparation of the liquid crystal composition for STN or TN, the amount of the compound of the formula (17), (18) or (19) used is preferably not more than 70% by weight, and more preferably not more than 60% by weight, based on the total weight of the liquid crystal composition.

In the liquid crystal display element of the present invention, except for the special case such as the liquid crystal composition for OCB (Optically Compensated Birefringence) mode, an optically active compound is usually added for the purpose of adjusting a helical pitch to match a twist angle by inducing a helical structure to the liquid crystal composition, or preventing a reverse twist. For such a purpose, any known optically active compounds can be used. The following optically active compounds can be recited as a preferable example.

For the liquid crystal composition used in the liquid crystal display element of the present invention, the pitch of twist is usually adjusted by addition of these optically active compounds. For the liquid crystal composition for TFT and TN, the twist pitch is preferably adjusted to the range of 40 to 200 am. For the liquid crystal composition for STN, it is preferably adjusted to the range of 6 to 20 μm. For the liquid crystal composition for bistable TN mode, it is preferably adjusted to the range of 1.5 to 4 μm. Further, two or more optically active compounds may be added for the purpose of adjusting a temperature dependence of pitch.

The liquid crystal composition used in the liquid crystal display element of the invention can be generally prepared by conventional methods, for example, the method of dissolving various components mutually at elevated temperatures, etc. The liquid crystal display element of the invention is improved and optimized according to the intended application, by adding suitable additives to the liquid crystal composition to be used, if required. Such additives are well known to those skilled in the art and fully described in the literature, etc.

The liquid crystal display elements of the present invention include a guest-host (GH) mode liquid crystal display element prepared by incorporating in the liquid crystal composition to be used diachronic dyes such as merocyanines, styryls, azo, azomethines, azoxy, quinophthalones, anthraquinones and tetrazines; a NCAP prepared by microcapsulating nematic liquid crystals; and a polymer dispersed liquid crystal display device (PDLCD) prepared by forming a three-dimentional network polymer in liquid crystals, typical example of which includes a polymer network liquid crystal display device (PNLCD); as well as liquid crystal display devices of electrically controlled birefringence mode (ECB) and dynamic scattering (DS) mode, etc.

BEST MODE FOR CARRYING OUT THE INVENTION

Figure 1:
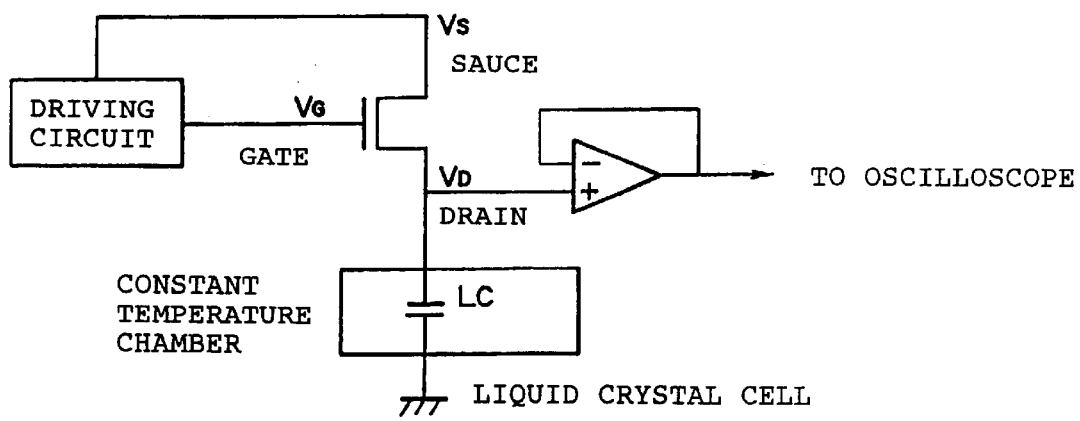
FIG. 1 is a circuit diagram used for measuring a voltage holding ratio.

1. Explanation About the Abbreviation of the Raw Material Component and Polymer Used in Each Example.

1) Tetracarboxylic Dianhydride Component
   PMDA: pyromellitic dianhydride
   CBDA: cyclobutane tetracarboxylic dianhydride
   BTDA: butane tetracarboxylic dianhydride
2) Diamino Compound Component
   DPM: 4,4'-diaminodiphenylmethane
   DPEt: 4,4'-diaminodiphenylethane
   4Ch: 1,1-bis[4-(4-aminophenylmethyl)phenyl]-4-n-butylcyclohexane
   5ChCh: 1,1-bis[4-(4-aminophenoxy)phenyl]-4-(4-pentylcyclohexyl)cyclohexane
3) Solvent Component
   NMP: N-methyl-2-pyrrolidone
   BC: butyl cellosolve
4) Polymer
   PA acid A: polyamic acid A
   PA acid B: polyamic acid B
   PI: soluble polyimide 2. Method of Synthesizing the Polymer Used in the Invention 1) Synthesis of Polyamic Acid A 500 ml four-necked flask equipped with a thermometer, a stirrer, a raw material inlet and a nitrogen gas inlet was charged with 4.89 g of DPM and 120.0 g of dehydrated NMP, and the mixture was stirred and dissolved under dry nitrogen gas stream. While keeping the temperature of the reaction system within the range of 5 to 70° C., 2.69 g of PMDA and 2.42 g of CBDA were added and reacted. Subsequently, 70.0 g of butylcellosolve were added and the mixture was reacted for 24 hours to afford 200 g of a polyamic acid (PA acid B1) varnish with a polymer concentration of 5% by weight. The weight average molecular weight of the polymer at that time was found to be 75,000.

Polyamic acid A1 varnish with a polymer concentration of 5% by weight was synthesized by the same method as mentioned above except for replacing the raw materials. The molecular weight at that time is shown in Table 1.

2) Synthesis of Soluble Polyimide

A 200 ml four-necked flask equipped with a thermometer, a stirrer, a raw material inlet and a nitrogen gas inlet was charged with 6.23 g of 4Ch and 4.02 g of 5ChCh and 54.37 ml of dehydrated NMP, and the mixture was stirred and dissolved under dry nitrogen gas stream.

While keeping the temperature of the reaction system within the range of 5 to 70° C., 1.87 g of CBDA and 1.89 g of BTDA which were an example of tetracarboxylic acids were added, and the mixture was reacted for 24 hours to afford about 70 g of a polyamic acid solution with a concentration of 20% by weight. To this solution were added 70 ml of NMP, 12.6 ml of acetic anhydride and 7.75 ml of pyridine, and the mixture was reacted for 2 hours while keeping the temperature of the reaction system within the range of 100 to 140° C. to afford a PI having a side chain (PI 1).

The PI 1 was purified through reprecipitation by addition of methanol and isolation, followed by dissolution by NMP and reprecipitation by addition of pure water, etc., and the weight average molecular weight was found to be 73,000.

TABLE 1

| | Raw material composition of polyamic acid and soluble polyimide (molar ratio) | | | | | | | |
|---|---|---|---|---|---|---|---|---|
| | Tetracarboxylic dianhydride | | | Diamino compound | | | | Molecular |
| Polymer | PMDA | CBDA | BTDA | DPA | DPEt | 4Ch | 5ChCh | weight |
| PA acid B1 | 25 | 25 | | 50 | | | | 75000 |
| PA acid A1 | | 35 | 15 | | 32.5 | 17.5 | | 83000 |
| PI 1 | | 25 | 25 | | | 32.5 | 17.5 | 73000 |

3. Preparation of Varnish for Aligning Film

Each polyamic acid was used as its 5% by weight solution as synthesized. A soluble polyimide was formed into a solution finally comprising 75% by weight of NMP, 20% by weight of BC and 5% by weight of polymer, by dissolving polyimide powders in NMP and adding BC.

These varnishes were mixed in the proportion indicated in Examples and Comparative Examples, and diluted to 3% to prepare a coating solution for forming an aligning film.

4. Preparation of Cell for Aligning Film Evaluation

1) Preparation of Cell for Voltage Holding Ratio Evaluation

Each coating varnish was coated with a spinner on a glass substrate having transparent electrodes of ITO, and pre-baked at 80° C. for about 5 minutes, and then heat-treated at 200° C. for 30 minutes. The surface of the substrate having an aligning film formed thereon was rubbed with a rubbing apparatus to carry out an alignment treatment. Subsequently, a gap material for 7 μm was sprayed to the substrate, and the circumference was sealed with an epoxy curing agent, while putting the aligning film-formed surface inside and leaving a liquid crystal injecting hole, to prepare an anti-parallel cell of 7 μm gap.

The following liquid crystal composition was injected into this cell as a liquid crystal material, and the injecting hole was sealed with a light curing agent and cured with UV irradiation. Subsequently, heat-treatment was performed at 110° C. for 30 minutes to form a cell for voltage holding ratio evaluation. The composition of the liquid crystal composition used is shown below (% is by weight).

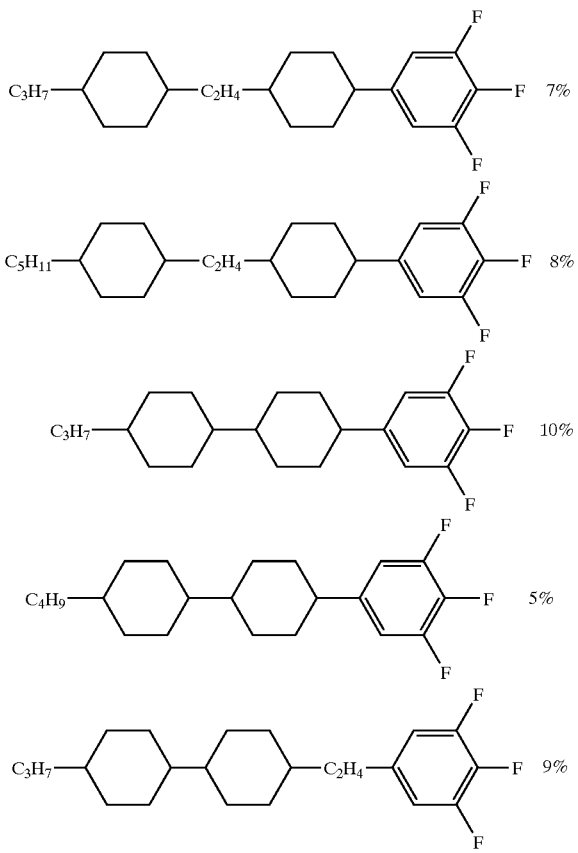

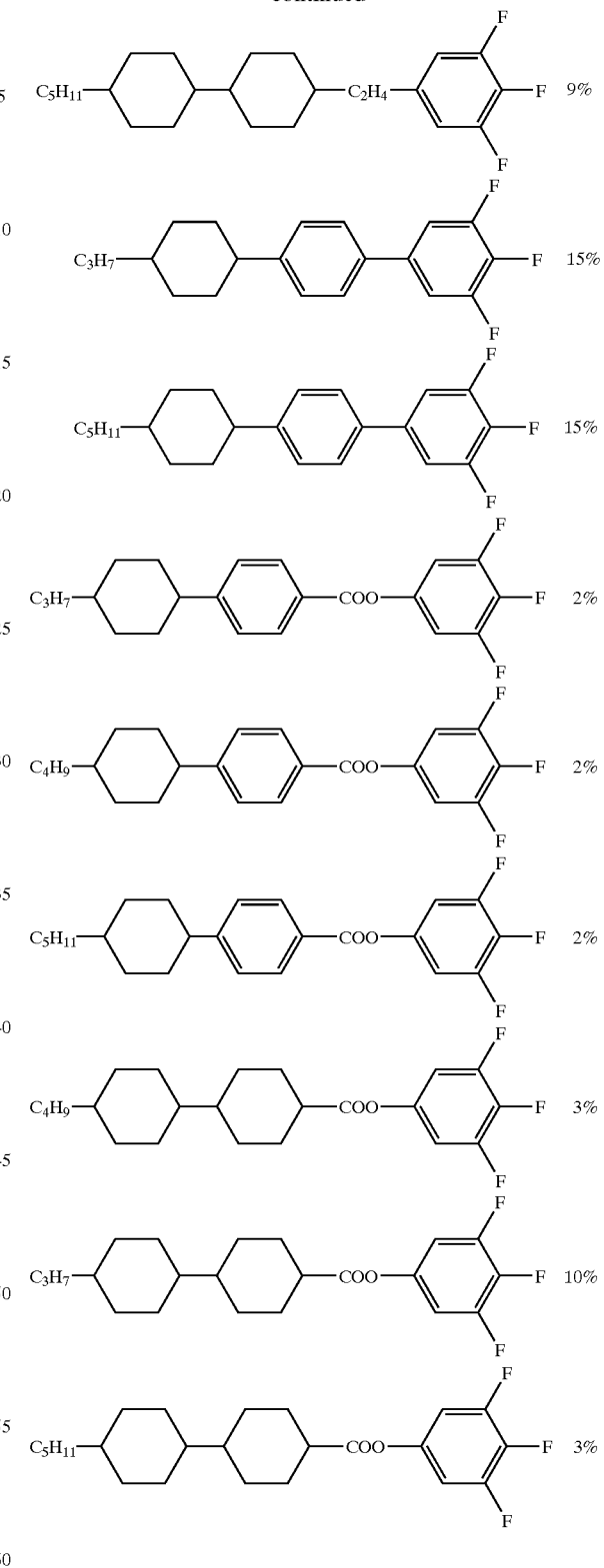

NI point of this composition was 81.3° C., and birefringence was 0.092.

2) Preparation of Cell for Image Sticking Evaluation

Each coating varnish was coated with a spinner on a glass substrate having transparent electrodes of ITO (matrix electrode), and pre-baked at 80° C. for about 5 minutes, and then heat-treated at 200° C. for 30 minutes. The surface of the substrate having an aligning film formed thereon was rubbed with a rubbing apparatus to carry out an alignment treatment. Subsequently, a gap material for 9 μm was sprayed to the substrate, and the circumference was sealed with an epoxy curing agent, while placing the aligning film-formed surface inside and leaving a liquid crystal injecting hole, to prepare a 90° twist cell of 9 μm gap.

The above-mentioned liquid crystal composition was injected into the cell as a liquid crystal material, and the injecting hole was sealed with a light curing agent and cured with UV irradiation to seal the liquid crystal. Subsequently, heat-treatment was performed at 110° C. for 30 minutes to form a cell for image sticking evaluation. As a liquid crystal material for image sticking evaluation was used the above-mentioned crystal composition in which 0.25% by weight of cholesteryl nonanoate based on the composition was incorporated as a chiral agent.

3) Preparation of Cell for Pretilt Angle Measurement

A cell for pretilt measurement was prepared by the same method except for using a gap material for 20 μm in the preparation of cell for voltage holding ratio evaluation to prepare an anti-parallel cell having a cell thickness of 20 μm. A liquid crystal material used in the pretilt measurement was the same as the liquid crystal material (excluding a chiral agent) used in the evaluation of the voltage holding ratio.

5. Evaluation Method of Liquid Crystal Cell

The evaluation method of the varnish of the present invention as an aligning film material is explained below.

1) Measuring Method of Voltage Holding Ratio

Figure 2:
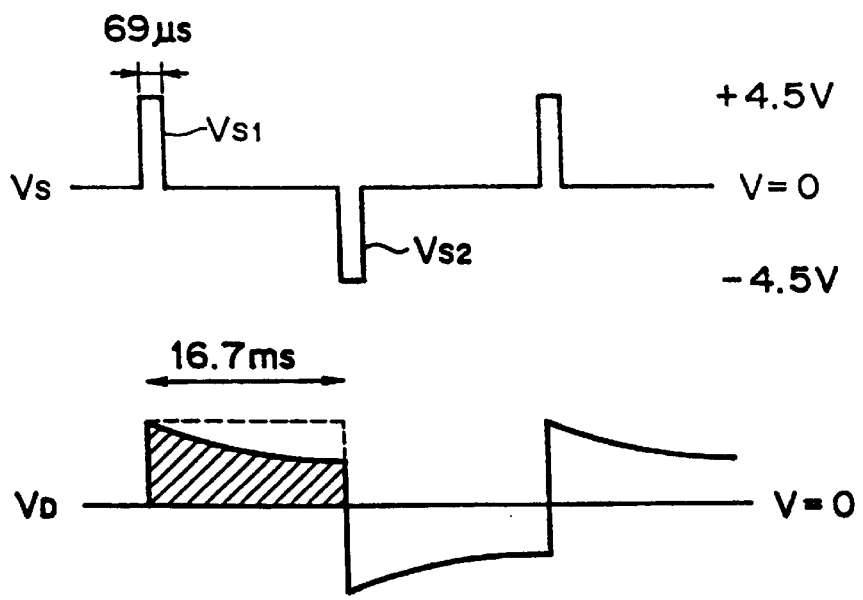
In FIG. 2, $V_S$ is a square wave of gate-pulse width 69 $\mu$s, frequency 60 HZ and wave height ±4.5V, and the period of polar conversion was 16.7 ms. $V_D$ is a wave pattern which applied $V_S$ to a sauce of the circuit shown in FIG. 1, and was read from the oscilloscope.

The measurement of voltage holding ratio, as shown in FIGS. 1 and 2, was carried out by applying to a sauce a square wave ($V_S$) of gate width 69 μs, frequency 60 HZ and wave height ±4.5V, and reading the changing drain ($V_D$) with an oscilloscope. If the voltage holding ratio is 100%, $V_D$ shown in FIG. 2 becomes the form of a rectangle shown by the dotted line. However, it usually serves as a solid line which approaches 0 gradually. With regard to the calculation method of holding ratio, it was expressed in terms of the percentage of the shaded area based on the shaded area and the area of a dotted line. Thus, the maximum voltage holding ratio is 100%. The voltage holding ratio is measured at 60° C.

2) Evaluation Method of Image Sticking

DC voltage 5V was applied at 60° C. for 3 hours to the cell for image sticking evaluation filled with the liquid crystal. Subsequently, AC voltage 4V (frequency 0.01 HZ) was applied at room temperature, and an occurrence of image sticking was evaluated by visual observation under crossed nicols. Evaluation of image sticking was judged as follows.

○: no image sticking observed

X: image sticking observed

3) Measuring Method of Pretilt Angle

A pretilt angle of liquid crystal was measured by a conventional crystal rotation method.

4) Evaluation Method of Coating Property

For the coating property, an occurrence of cissing was evaluated upon coating the varnish with a spinner in the above-mentioned preparation of cell. The criteria are as follows.

○: no cissing

Δ: occurrence of cissing on the periphery of substrate

X: cissing concentrated in the center area of substrate or with its tendency

6. COMPARATIVE EXAMPLES 1–14 AND EXAMPLES 1–14

The results are shown in Table 2 for the case where only soluble polyimide (PI 1) or only polyamic acid A component (PA acid A1) was mixed with polyamic acid B1 (PA acid B1). The results are shown in Tables 3 and 4 for the case where three components were mixed. In Tables 2–4, the abbreviation VHR stands for voltage holding ratio (%) and the figure in the column of polymer component shows a mixing ratio by weight.

These results show that the combination of PA acid B1 with PA acid A1 and the three component system with PI 1 further combined give a larger pretilt angle than the case where PA acid B1 was mixed with only soluble polyimide. As is seen from the comparison of a diamine component used as a raw material between PI 1 and PA acid A1, PI 1 has the component having a longer side chain. Since PI 1 has the larger amount of the component having a longer side chain than PA acid A1, it is supposed that PI 1 may contribute to an increase in pretilt angle more than PA acid A1 from the viewpoint of raw materials. This shows that it is difficult to increase the pretilt angle by polyimide, although the mechanism is not clear. From this result, it can be expected to easily prevent domain formation which may tend to occur when the pretilt angle is small. Accordingly, it is not required to mix a large quantity of polyimide for the purpose of increasing the pretilt angle, thus preventing the deterioration of coating property when polyimide is mixed in a large quantity.

Further, it is found that the system of three components mixed can overcome the problem of image sticking in the system of polyamic acid B component and polyamic acid A component mixed, and in the system free from polyamic acid B the voltage holding ratio is small and the image sticking is poor. In these Examples, it was found that the coating thickness was uniform (judged from the uniformity of interference color of the coating) and there was no problem of the alignment of liquid crystal.

TABLE 2

| | Comparative Examples 1–10 | | | | | | | | | |
|---|---|---|---|---|---|---|---|---|---|---|
| | 1 | 2 | 3 | 4 | 5 | 6 | 7 | 8 | 9 | 10 |
| PA acid B1 | 94 | 92 | 90 | 80 | 0 | 94 | 92 | 90 | 80 | 0 |
| PI 1 | 6 | 8 | 10 | 20 | 100 | 0 | 0 | 0 | 0 | 0 |
| PA acid A1 | 0 | 0 | 0 | 0 | 0 | 6 | 8 | 10 | 20 | 100 |
| Pretilt angle | 0.8 | 1.2 | 1.4 | 2.6 | — | 6.6 | 8.7 | 10.2 | 10.9 | 10.7 |
| Coating property | ○ | ○ | ○ | Δ | x | ○ | ○ | ○ | ○ | ○ |
| VHR | 98.6 | 98.5 | 98.4 | 98.2 | — | 98.8 | 98.6 | 98.6 | 98.4 | 96.8 |
| Image sticking | ○ | ○ | ○ | ○ | — | x | x | x | x | x |

TABLE 3

Examples 1–8 and Comparative Examples 11–12
In Examples 1–4 and Comparative Examples 11, PI
1/PA acid A1 = 20/80. In Examples 5–8 and Comparative
Example 12, PI 1/PA acid A1 = 80/20.

|  | Example | | | | Com. Ex. | Example | | | | Com. Ex. |
|---|---|---|---|---|---|---|---|---|---|---|
|  | 1 | 2 | 3 | 4 | 11 | 5 | 6 | 7 | 8 | 12 |
| PA acid B1 | 94.0 | 92.0 | 90.0 | 80.0 | 0 | 94.0 | 92.0 | 90.0 | 80.0 | 0 |
| PI 1 | 1.2 | 1.6 | 2.0 | 4.0 | 20 | 4.8 | 6.4 | 8.0 | 16.0 | 80 |
| PA acid A1 | 4.8 | 6.4 | 8.0 | 16.0 | 80 | 1.2 | 1.6 | 2.0 | 4.0 | 20 |
| Pretilt angle | 5.6 | 7.3 | 7.3 | 6.8 | 5.2 | 2.7 | 3.0 | 3.4 | 4.3 | 4.0 |
| Coating property | ○ | ○ | ○ | ○ | Δ | ○ | ○ | ○ | ○ | × |
| VHR | 98.6 | 98.7 | 98.7 | 98.6 | 96.8 | 98.6 | 98.7 | 98.7 | 98.5 | 96.5 |
| Image sticking | ○ | ○ | ○ | ○ | × | ○ | ○ | ○ | ○ | × |

TABLE 4

Examples 9–14 and Comparative Examples 13–14
In Examples 9–12 and Comparative Examples 13, PI
1/PA acid A1 = 60/40. In Examples 13–14 and Comparative
Example 14, PI 1/PA acid A1 = 10/90.

|  | Example | | | | Com. Ex. | Example | | Com. Ex. |
|---|---|---|---|---|---|---|---|---|
|  | 9 | 10 | 11 | 12 | 13 | 13 | 14 | 14 |
| PA acid B1 | 94.0 | 92.0 | 90.0 | 80.0 | 0 | 90.0 | 80.0 | 0 |
| PI 1 | 3.6 | 4.8 | 6.0 | 12.0 | 60 | 1.0 | 2.0 | 10 |
| PA acid A1 | 2.4 | 3.2 | 4.0 | 8.0 | 40 | 9.0 | 18.0 | 90 |
| Pretilt angle | 3.5 | 4.1 | 4.6 | 4.9 | 4.5 | 8.8 | 8.9 | 8.0 |
| Coating property | ○ | ○ | ○ | ○ | × | ○ | ○ | Δ |
| VHR | 98.8 | 98.7 | 98.7 | 98.6 | 96.5 | 98.6 | 98.4 | 98.0 |
| Image sticking | ○ | ○ | ○ | ○ | × | ○ | ○ | × |

INDUSTRIAL APPLICABILITY

The use of the varnish composition of the present invention as a liquid crystal aligning agent results in an excellent liquid crystal display element which has good alignment and coating properties, an arbitrarily controllable pretilt angle, gives no or little image sticking, and has large voltage holding ratio.

The varnish composition of the present invention is used most preferably in TFT elements (TN type TFT, IPS element), STN elements or OCB elements, etc. Further, it can be used as an aligning agent for ferroelectric and antiferroelectric liquid crystal display elements, because of its excellent electrical properties and arbitrarily controllable pretilt angle. Furthermore, a thin coat according to the varnish composition of the present invention may be used as a protective coat and an insulating coat, because of its excellent electrical properties.

What is claimed is:

1. A varnish composition which comprises a polymer component containing a polyamic acid B represented by formula (1), a polyamic acid A represented by formula (2) and a soluble polyimide represented by formula (3), and a solvent for dissolving the polymer component, in which the weight ratio of the polyamic acid A to the soluble polyimide in the polymer component is 1/99 to 99/1, the sum of the polyamic acid A and the soluble polyimide accounts for 1 to 80% by weight of the polymer component, the polyamic acid B accounts for 99 to 20% by weight of the polymer component, and the proportion of the polymer component in the whole varnish composition is 0.1 to 40% by weight;

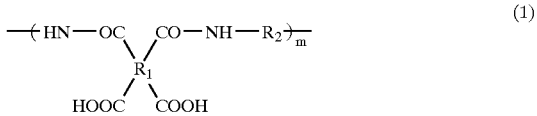

(1)

wherein $R_1$ is a tetravalent organic radical derived from tetracarboxylic acids, $R_2$ is a divalent organic radical derived from a diamine, each of which is a radical having no side chain, a radical having an alkyl side chain of less than 3 carbon atoms or a radical comprising a mixture of these, and m is a positive integer;

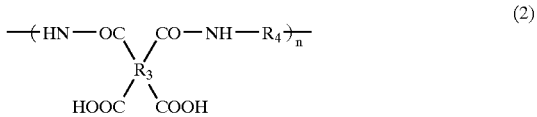

(2)

wherein $R_3$ is a tetravalent organic radical derived from tetracarboxylic acids, $R_4$ is a divalent organic radical derived from a diamine, at least one of $R_3$ and $R_4$ is a radical having a side chain of 3 or more carbon atoms or a radical comprising said radical, and n is a positive integer; and

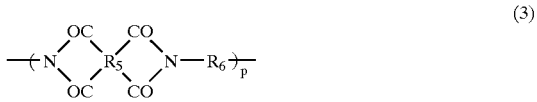

(3)

wherein $R_5$ is a tetravalent organic radical derived from tetracarboxylic acids, $R^6$ is a divalent organic radical derived from a diamine, and p is a positive integer.

2. The varnish composition of claim 1, wherein the soluble polyimide represented by formula (3) in the polymer component contains a radical having a side chain of 3 or more carbon atoms in at least one of the tetravalent organic radical $R_5$ derived from tetracarboxylic acids and the divalent organic radical $R_6$ derived from a diamine, the weight ratio of the polyamic acid A to the soluble polyimide is 10/90 to 90/10, and the sum of the polyamic acid A and the soluble polyimide accounts for 2 to 50% by weight of the polymer component.

3. The varnish composition of claim 1, wherein in the polyamic acid B represented by formula (1), 10 to 100 mol % of the tetravalent organic radical $R_1$ derived from tetracarboxylic acids is a tetravalent organic radical derived from alicyclic tetracarboxylic acids, and the divalent organic radical $R_2$ derived from a diamine is a radical comprising at least one divalent organic radical selected from the group consisting of a divalent organic radical derived from an aromatic diamine, a divalent organic radical derived from an alicyclic diamine, and a divalent organic radical derived from a diamine containing two or more groups of aromatic, alicyclic and aliphatic groups.

4. The varnish composition of claim 1, wherein in the polyamic acid B represented by formula (1), 10 to 100 mol % of the tetravalent organic radical $R_1$ derived from tetracarboxylic acids is a tetravalent organic radical derived from alicyclic tetracarboxylic acids, and 1 to 100 mol % of the divalent organic radical $R_2$ derived from a diamine is at least one radical selected from the group consisting of the radicals represented by formula (4)

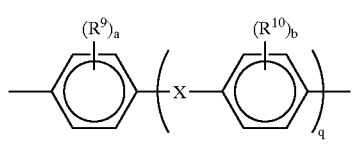
(4)

wherein X represents a single bond, $CH_2$, $CH_2CH_2$, $CH_2CH_2CH_2$, $CH_2CH_2CH_2CH_2$ or $C(CH_3)_2$, $R^9$ and $R^{10}$ each independently represent hydrogen, methyl or ethyl, a and b are individually an integer of 1 or 2, and q is an integer of 0 to 3, provided that when q is 2 or 3, each X may be different from each other.

5. The varnish composition of claim 1, wherein in the polyamic acid B represented by formula (1), 10 to 100 mol % of the tetravalent organic radical $R_1$ derived from tetracarboxylic acids is a tetravalent organic radical derived from cyclobutanetetracarboxylic acids, and the divalent organic radical $R_2$ derived from a diamine is a radical comprising a divalent organic radical derived from at least one compound selected from the group consisting of 4,4'-diaminodiphenylmethane, 4,4'-diaminodiphenylethane, 1,4-bis[2-(4-aminophenyl)ethyl]benzene, 1,4-bis(4-aminophenylmethyl)benzene, 1,3-bis[4-(4-aminophenylmethyl)phenyl]propane and bis[4-(4-aminophenylmethyl)phenyl]methane.

6. The varnish composition of claim 1, wherein in the polyamic acid A represented by formula (2), $R_3$ is at least one tetravalent organic radical selected from the group consisting of a tetravalent organic radical derived from aromatic tetracarboxylic acids, a tetravalent organic radical derived from aliphatic tetracarboxylic acids and a tetravalent organic radical derived from alicyclic tetracarboxylic acids, and $R_4$ is at least one divalent organic radical selected from the group consisting of divalent organic radicals derived from an aromatic diamine, an alicyclic diamine and an aliphatic diamine.

7. The varnish composition of claim 1, wherein in the polyamic acid A represented by formula (2), 1 to 100 mol % of the divalent organic radical $R_4$ derived from a diamine is a divalent organic radical derived from a diamine having a side chain of 3 or more carbon atoms.

8. The varnish composition of claim 1, wherein in the polyamic acid A represented by formula (2), the tetravalent organic radical $R_3$ derived from tetracarboxylic acids contains as an essential ingredient, a radical of pyromellitic acids, a radical of cyclobutane tetracarboxylic acids, or both the radical of pyromellitic acids and the radical of cyclobutane tetracarboxylic acids, 1 to 100 mol % of the divalent organic radical $R_4$ derived from a diamine is at least one radical selected from the group consisting of the radicals represented by formulas (5-1), (5-2), (5-3), (54), (6), (7) and (8), and 99 to 0 mol % of said divalent oganic radical is at least one radical selected from the group consisting of the radicals represented by the formula (4);

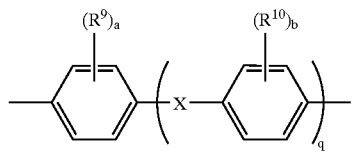
(4)

wherein X represents a single bond, $CH_2$, $CH_2CH_2$, $CH_2CH_2CH_2$, $CH_2CH_2CH_2CH_2$ or $C(CH_3)_2$, $R^9$ and $R^{10}$ each independently represent hydrogen, methyl or ethyl, a and b are individually an integer of 1 or 2, and q is an integer of 0 to 3, provided that when q is 2 or 3, each X may be different from each other;

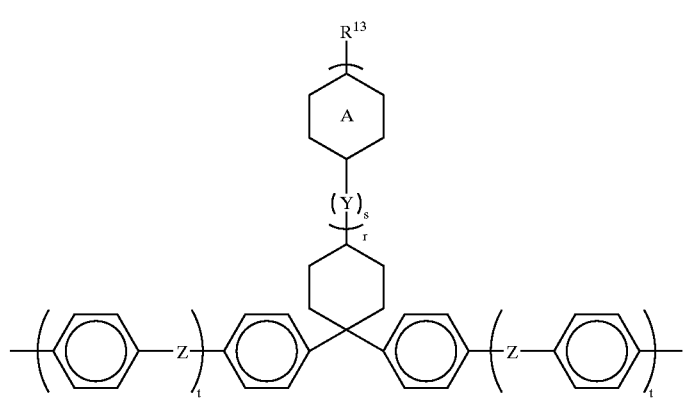
(5-1)

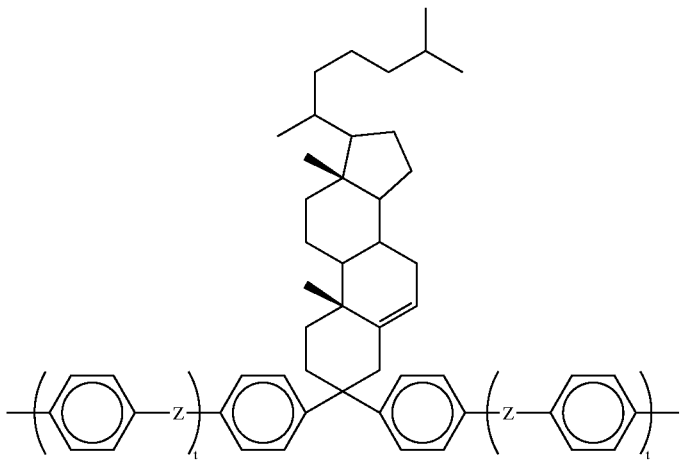

(5-2)

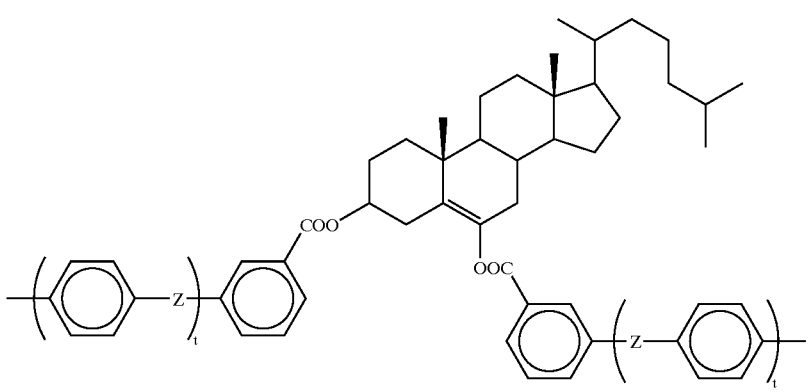

(5-3)

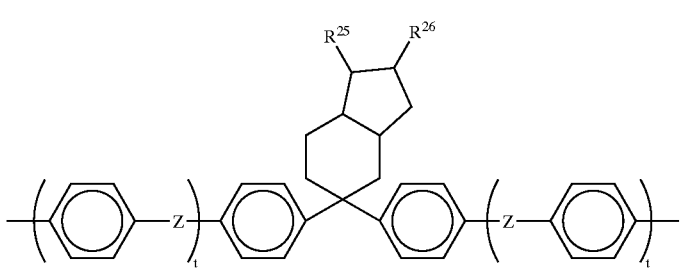

(5-4)

wherein $R^{13}$, $R^{25}$ and $R^{26}$ each independently represent hydrogen or a linear or branched alkyl of 1–12 carbon atoms, Y is methylene, ring A represents a benzene ring or a cyclohexane ring, Z represents a single bond, $CH_2$, $CH_2CH_2$ or oxygen, r is an integer of 0–3, s is an integer of 0–5, t is an integer of 0–3, provided that when t is 2 or 3, each Z may be the same or different from each other; any hydrogen on the benzene or cyclohexane ring may be replaced by an alkyl group of 1–4 carbon atoms; and the steroid skeleton in the formulas (5-2) and (5-3) may be the one wherein any ring is reduced, enlarged or cleaved, or contains a three-membered ring, the one wherein an unsaturated bond in any position is increased or decreased, or the one wherein hydrogen or alkyl in any position is replaced by any monovalent organic group;

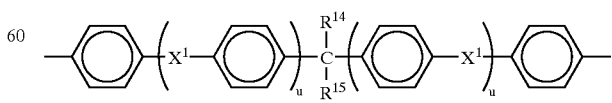

(6)

wherein $X^1$ represents a single bond, $CH_2$, $CH_2CH_2$ or oxygen, $R^{14}$ and $R^{15}$ each independently represent hydrogen, or an alkyl or perfluoroalkyl group having a linear or branched alkyl of 1–12 carbon atoms, but at least one of $R^{14}$ and $R^{15}$ represents an alkyl or perfluoroalkyl group having a linear or branched alkyl of 3 or more carbon atoms, and u is an integer of 0–3, provided that when u is 2 or 3, each $X^1$ may be the same or different from each other; and any hydrogen on the benzene ring may be replaced by an alkyl group of 1–4 carbon atoms;

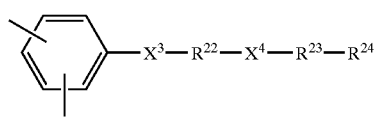
(7)

wherein $X^3$ and $X^4$ each independently represent a single bond, O, COO, OCO, NH, CONH or $(CH_2)_n$, $R^{22}$ and $R^{23}$ each independently represent a single bond, a group of 1–3 rings having an aromatic ring and/or an alicyclic ring (when $R^{22}$ and/or $R^{23}$ have 2 or 3 rings, these rings may be bonded with a single bond, O, COO, OCO, NH, CONH or $(CH_2)_n$), or a steroid group, $R^{24}$ represents hydrogen, fluorine, hydrocarbyl, fluorohydrocarbyl, alkoxy, cyano or OH, and n is an integer of 1–5; and

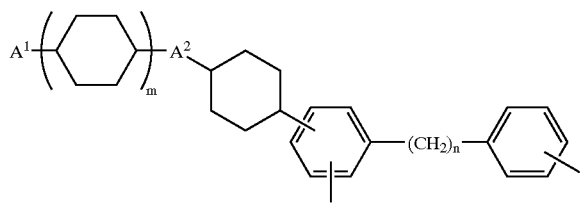
(8)

wherein $A^1$ is hydrogen or a linear or branched alkyl of 1–12 carbon atoms in which any non-adjacent methylene may be replaced by oxygen, $A^2$ is a single bond or an alkylene of 1–5 carbon atoms in which any non-adjacent methylene may be replaced by oxygen, m is an integer of 0–3, and n is an integer of 1–5.

9. The varnish composition of claim 1, wherein in the soluble polyimide represented by formula (3), the tetravalent organic radical $R_5$ derived from tetracarboxylic acids is at least one tetravalent organic radical selected from the group consisting of a tetravalent organic radical derived from aromatic tetracarboxylic acids, a tetravalent organic radical derived from aliphatic tetracarboxylic acids and a tetravalent organic radical derived from alicyclic tetracarboxylic acids, and the divalent organic radical $R_6$ derived from a diamine is at least one divalent organic radical selected from the group consisting of divalent organic radicals derived from an aromatic diamine, an alicyclic diamine and an aliphatic diamine.

10. The varnish composition of claim 1, wherein in the soluble polyimide represented by formula (3), 1 to 100 mol % of the divalent organic radical $R_6$ derived from a diamine is a divalent organic radical derived from a diamine having a side chain of 3 or more carbon atoms.

11. The varnish composition of claim 1, wherein in the soluble polyimide represented by formula (3), the tetravalent organic radical $R_5$ derived from tetracarboxylic acids is at least one radical selected from the group consisting of the radicals derived from tricarboxycyclopentyl acetic acids, 3,3,4-tricarboxy-1,2,3,4-tetrahydronaphthalene succinic acids, cyclobutane tetracarboxylic acids and butane tetracarboxylic acids, 1 to 100 mol % of the divalent organic radical $R_6$ derived from a diamine is at least one radical selected from the group consisting of the radicals represented by formulas (5-1), (5-2), (5-3), (5-4), (6), (7) and (8), and 99 to 0 mol % of said divalent organic radical is at least one radical selected from the group consisting of the radicals represented by the formula (4)

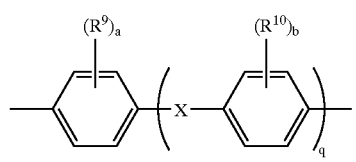
(4)

wherein X represents a single bond, $CH_2$, $CH_2CH_2$, $CH_2CH_2CH_2$, $CH_2CH_2CH_2CH_2$ or $C(CH_3)_2$, $R^9$ and $R^{10}$ each independently represent hydrogen, methyl or ethyl, a and b are individually an integer of 1 or 2, and q is an integer of 0 to 3, provided that when q is 2 or 3, each X may be different from each other;

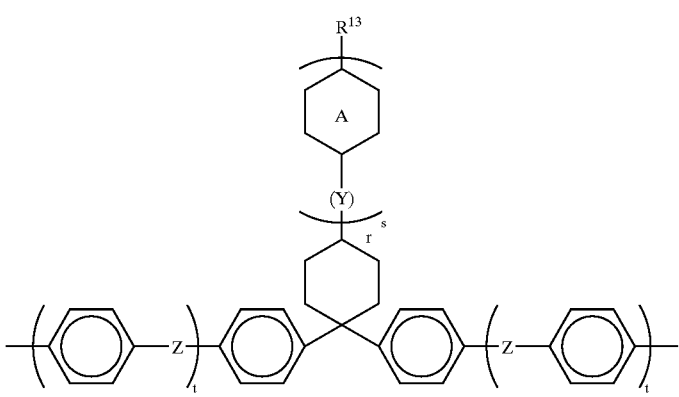
(5-1)

-continued (5-2)

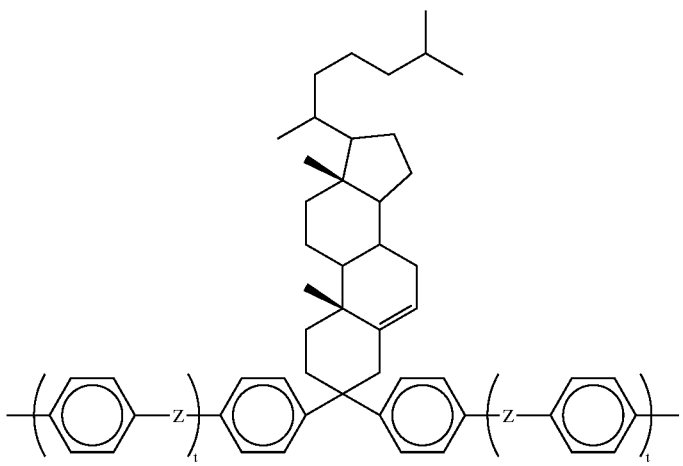

(5-3)

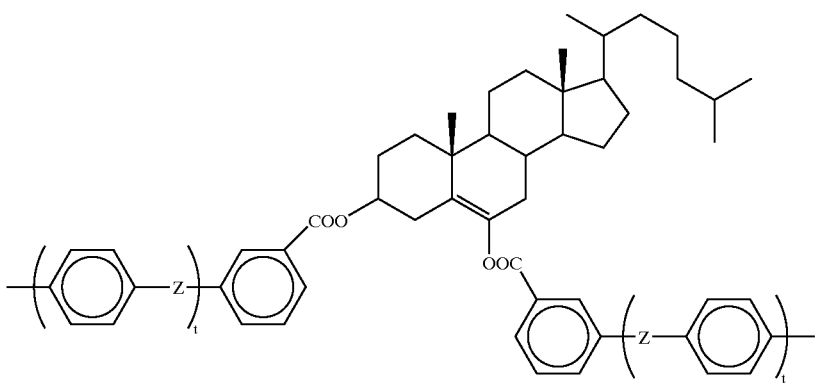

(5-4)

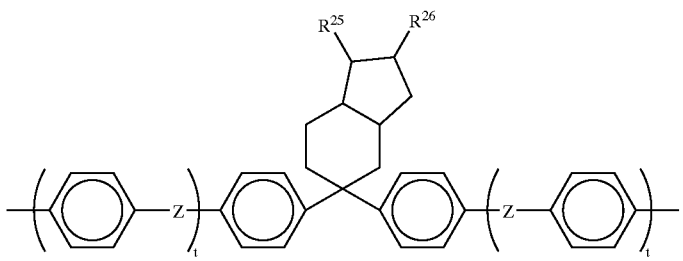

wherein $R^{13}$, $R^{25}$ and $R^{26}$ each independently represent hydrogen or a linear or branched alkyl of 1–12 carbon atoms, Y is methylene, ring A represents a benzene ring or a cyclohexane ring, Z represents a single bond, $CH_2$, $CH_2CH_2$ or oxygen, r is an integer of 0–3, s is an integer of 0–5, t is an integer of 0–3, provided that when t is 2 or 3, each Z may be the same or different from each other; any hydrogen on the benzene ring or cyclohexane ring may be replaced by an alkyl group of 1–4 carbon atoms; and the steroid skeleton in the formulas (5-2) and (5-3) may be the one wherein any ring is reduced, enlarged or cleaved, or contains a three-membered ring, the one wherein an unsaturated bond in any position is increased or decreased, or the one wherein hydrogen or alkyl in any position is replaced by any monovalent organic group;

(6)

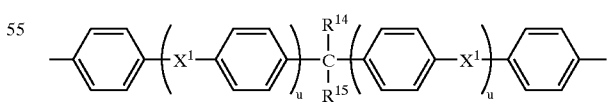

wherein $X^1$ represents a single bond, $CH_2$, $CH_2CH_2$ or oxygen, $R^{14}$ and $R^{15}$ each independently represent hydrogen, or an alkyl or perfluoroalkyl group having a linear or branched alkyl of 1–12 carbon atoms, but at least one of $R^{14}$ and $R^{15}$ represents an alkyl or perfluoroalkyl group having a linear or branched alkyl of 3 or more carbon atoms, and u is an integer of 0–3, provided that when u is 2 or 3, each $X^1$ may be the same or different from each other, and any hydrogen on the benzene ring may be replaced by an alkyl group of 1–4 carbon atoms,

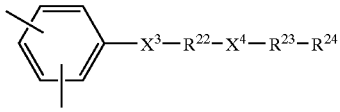
(7)

wherein $X^3$ and $X^4$ each independently represent a single bond, O, COO, OCO, NH, CONH or $(CH_2)_n$, $R^{22}$ and $R^{23}$ each independently represent a single bond, a group of 1–3 rings having an aromatic ring and/or an alicyclic ring (when $R^{22}$ and/or $R^{23}$ have 2 or 3 rings, these rings may be bonded with a single bond, O, COO, OCO, NH, CONH or $(CH_2)_n$), or a steroid group, $R^{24}$ represents hydrogen, fluorine, hydrocarbyl, fluorohydrocarbyl, alkoxy, cyano or OH and n is an integer of 1–5, and

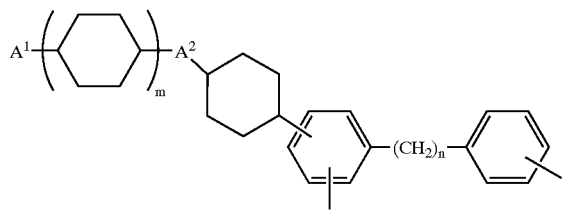
(8)

wherein $A^1$ is hydrogen or a linear or branched alkyl of 1–12 carbon atoms in which any non-adjacent methylene may be replaced by oxygen, $A^2$ is a single bond or an alkylene of 1–5 carbon atoms in which any non-adjacent methylene may be replaced by oxygen, m is an integer of 0–3, and n is an integer of 1–5.

12. A liquid crystal aligning agent comprising the arnish composition as claimed in any one of claims 1 to 11.

13. A liquid crystal display element having an aligning film comprising the liquid crystal aligning agent as claimed in claim 12.

14. The liquid crystal display element of claim 13 comprising a liquid crystal composition comprising two or more compounds, which contains at least one compound selected from the group consisting of the compounds represented by formulas (9), (10) and (11), and at least one optically active compound as an optional component;

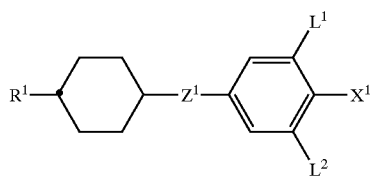
(9)

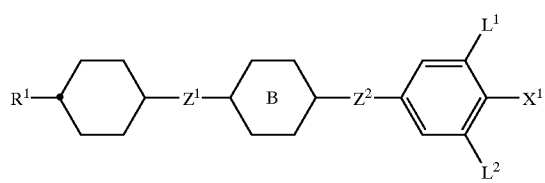
(10)

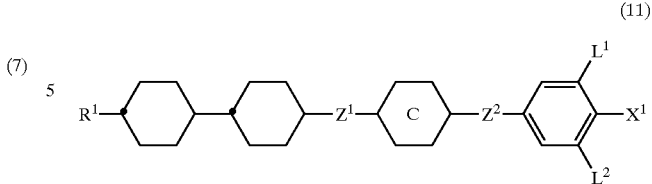
(11)

wherein $R^1$ represents a linear or branched alkyl of 1–10 carbon atoms in which any non-adjacent methylene may be replaced by —O— or —CH=CH— and any hydrogen may be replaced by fluorine; $X^1$ represents fluorine, chlorine, —OCF$_3$, —OCF$_2$H, —CF$_3$, —CF$_2$H, —CFH$_2$, —OCF$_2$CF$_2$H or —OCF$_2$CFHCF$_3$; $L^1$ and $L^2$ each independently represent hydrogen or fluorine; $Z^1$ and $Z^2$ each independently represent 1,2-ethylene, 1,4-butylene, —COO—, —CF$_2$O—, —OCF$_2$—, —CH=CH— or a single bond; ring B represents trans-1,4-cyclohexylene, 1,3-dioxane-2,5-diyl, or 1,4-phenylene in which hydrogen may be replaced by fluorine; and ring C represents tran-1,4-cyclohexylene or 1,4-phenylene in which hydrogen may be replaced by fluorine.

15. The liquid crystal display element of claim 13 comprising a liquid crystal composition comprising two or more compounds, which contains at least one compound selected from the group consisting of the compounds represented by formulas (12) and (13), and at least one optically active compound as an optional component;

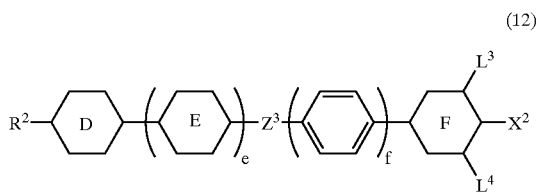
(12)

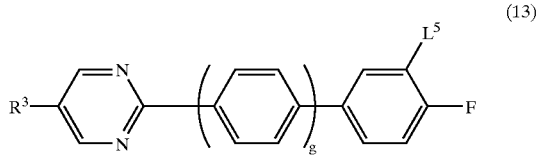
(13)

wherein $R^2$ and $R^3$ each independently represent a linear or branched alkyl group of 1–10 carbon atoms in which any non-adjacent methylene may be replaced by —O— or —CH=CH— and any hydrogen may be replaced by fluorine; $X^2$ represents —CN or —C≡C—CN; ring D represents trans-1,4-cyclohexylene, 1,4-phenylene, 1,3-dioxane-2,5-diyl or pyrimidine-2,5-diyl; ring E represents trans-1,4-cyclohexylene, pyrimidine-2,5-diyl or 1,4-phenylene in which hydrogen may be replaced by fluorine; ring F represents tran-1,4-cyclohexylene or 1,4-phenylene, $Z^3$ represents 1,2-ethylene, —COO— or a single bond; $L^3$, $L^4$ and $L^5$ each independently represent hydrogen or fluorine; and e, f and g each independently represent 0 or 1.

16. The liquid crystal display element of claim 13 comprising a liquid crystal composition comprising two or more compounds, which contains at least one compound selected from the group consisting of the compounds represented by formulas (14), (15) and (16), and at least one optically active compound as an optional component;

(14)

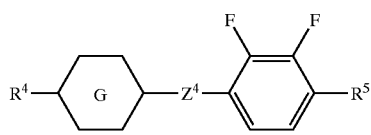

(15)

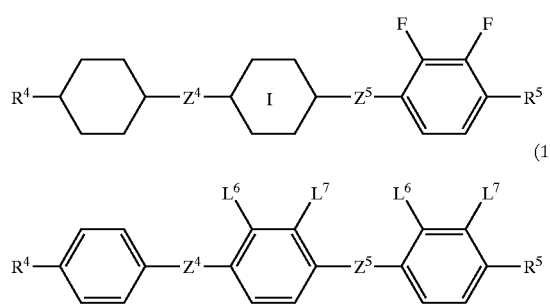

(16)

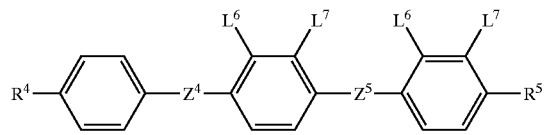

wherein $R^4$ and $R^5$ each independently represent a linear or branched alkyl group of 1–10 carbon atoms in which any non-adjacent methylene may be replaced by —O— or —CH=CH— and any hydrogen may be replaced by fluorine; rings G and I each independently represent trans-1,4-cyclohexylene or 1,4-phenylene; $L^6$ and $L^7$ each independently represent hydrogen or fluorine but do not represent hydrogen at the same time; and $Z^4$ and $Z^5$ each independently represent 1,2-ethylene, —COO— or a single bond.

17. The liquid crystal display element of claim 14 comprising a liquid crystal composition which comprises at least one compound selected from the group consisting of the compounds represented by formulas (9), (10) and (11) as a first component, at least one compound selected from the group consisting of the compounds represented by formulas (17), (18) and (19) as a second component, and at least one optically active compound as an optional third component;

(17)

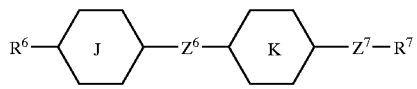

(18)

(19)

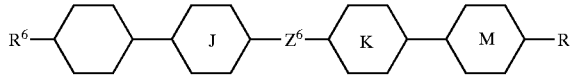

wherein $R^6$ and $R^7$ each independently represent a linear or branched alkyl group of 1–10 carbon atoms in which any non-adjacent methylene may be replaced by —O— or —CH=CH— and any hydrogen may be replaced by fluorine; rings J, K and M each independently represent trans-1,4-cyclohexylene, pyrimidine-2,5-diyl or 1,4-phenylene in which hydrogen may be replaced by fluorine; and $Z^6$ and $Z^7$ each independently represent 1,2-ethylene, —C≡C—, —COO—, —CH=CH— or a single bond.

18. The liquid crystal display element of claim 15 comprising a liquid crystal composition which comprises at least one compound selected from the group consisting of the compounds represented by formulas (12) and (13) as a first component, at least one compound selected from the group consisting of the compounds represented by formulas (17), (18) and (19) as a second component, and at least one optically active compound as an optional third component;

(17)

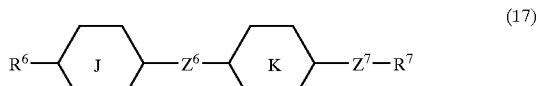

(18)

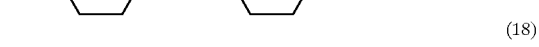

(19)

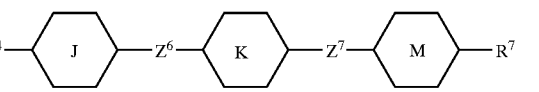

wherein $R^6$ and $R^7$ each independently represent a linear or branched alkyl group of 1–10 carbon atoms in which any non-adjacent methylene may be replaced by —O— or —CH=CH— and any hydrogen may be replaced by fluorine; rings J, K and M each independently represent trans-1,4-cyclohexylene, pyrimidine-2,5-diyl or 1,4-phenylene in which hydrogen may be replaced by fluorine; and Z6 and Z7 each independently represent 1,2-ethylene, —C≡C—, —COO—, —CH=CH— or a single bond.

19. The liquid crystal display element of claim 16 comprising a liquid crystal composition which comprises at least one compound selected from the group consisting of the compounds represented by formulas (14), (15) and (16) as a first component, at least one compound selected from the group consisting of the compounds represented by formulas (17), (18) and (19) as a second component, and at least one optically active compound as an optional third component;

(17)

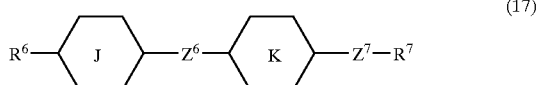

(18)

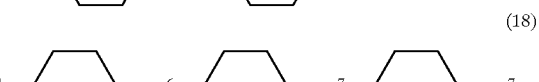

(19)

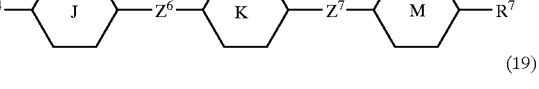

wherein $R^6$ and $R^7$ each independently represent a linear or branched alkyl group of 1–10 carbon atoms in which any non-adjacent methylene may be replaced by —O— or —CH=CH— and any hydrogen may be replaced by fluorine; rings J, K and M each independently represent trans-1,4-cyclohexylene, pyrimidine-2,5-diyl or 1,4-phenylene in which hydrogen may be replaced by fluorine; and $Z^6$ and $Z^7$ each independently represent 1,2-ethylene, —C≡C—, —COO—, —CH=CH— or a single bond.

20. The liquid crystal display element of claim 14 comprising a liquid crystal composition which comprises at least one compound selected from the group consisting of the compounds represented by formulas (9), (10) and (11) as a first component, at least one compound selected from the group consisting of the compounds represented by formulas (12) and (13) as a second component, at least one compound selected from the group consisting of the compounds represented by formulas (17), (18) and (19) as a third component, and at least one optically active compound as an optional fourth component;

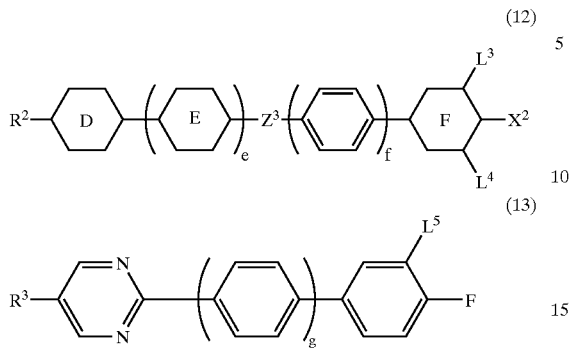

(12)

(13)

wherein $R^2$ and $R^3$ each independently represent a linear or branched alkyl group of 1–10 carbon atoms in which any non-adjacent methylene may be replaced by —O— or —CH=CH— and any hyrogen may be replaced by fluorine; $X^2$ represents —CN or —C≡C—CN; ring D represents trans-1,4-cyclohexylene, 1,4-phenylene, 1,3-dioxane-2,5-diyl or pyrimidine-2,5-diyl; ring E represents trans-1,4-cyclohexylene, pyrimidine-2,5-diyl or 1,4-phenylene in which hydrogen may be replaced by fluorine; ring F represents tran-1,4-cyclohexylene or 1,4-phenylene, $Z^3$ represents 1,2-ethylene, —COO— or a single bond; $L^3$, $L^4$ and $L^5$ each independently represent hydrogen or florine; and e, f and g each independently represent 0 or 1; and

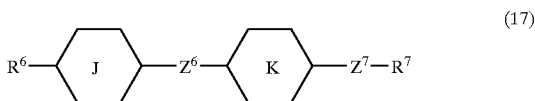

(17)

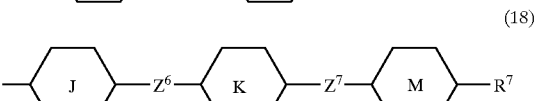

(18)

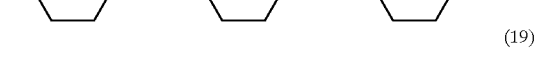

(19)

wherein $R^6$ and $R^7$ each independently represent a linear or branched alkyl group of 1–10 carbon atoms in which any non-adjacent methylene may be replaced by —O— or —CH=CH— and any hydrogen may be replaced by fluorine; rings J, K and M each independently represent trans-1,4-cyclohexylene, pyrimidine-2,5-diyl or 1,4-phenylene in which hydrogen may be replaced by fluorine; and $Z^6$ and $Z^7$ each independently represent 1,2-ethylene, —C≡C—, —COO—, —CH=CH— or a single bond.

* * * * *

UNITED STATES PATENT AND TRADEMARK OFFICE
CERTIFICATE OF CORRECTION

PATENT NO. : 6,746,730 B1
DATED : June 8, 2004
INVENTOR(S) : Satoshi Tanioka et al.

It is certified that error appears in the above-identified patent and that said Letters Patent is hereby corrected as shown below:

Column 10,
Line 25, change "tran" to -- trans --.

Column 54,
Line 55, change "$R^6$" to -- $R_6$ --.

Column 63,
Line 38, change "arnish" to -- varnish --.

Column 64,
Line 22, change "tran" to -- trans --.

Column 66,
Line 10, change "$R^4$" in formula (18) to -- $R^6$ --.
Line 24, change "Z6 and Z7" to -- $Z^6$ and $Z^7$ --.
Line 43, change "$R^4$" in formula (18) to -- $R^6$ --.

Column 67,
Line 2, from the bottom, change "tran" to -- trans --.

Column 68,
Line 10, change "$R^4$" in formula (18) to -- $R^6$ --.

Signed and Sealed this

Fourteenth Day of September, 2004

JON W. DUDAS
*Director of the United States Patent and Trademark Office*